United States Patent
Noirie et al.

(10) Patent No.: US 12,519,624 B2
(45) Date of Patent: Jan. 6, 2026

(54) IDENTITY AUTHENTICATION FOR QKD PROTOCOLS

(71) Applicant: Nokia Technologies Oy, Espoo (FI)

(72) Inventors: Ludovic Noirie, Massy (FR); Rémi Varloot, Massy (FR)

(73) Assignee: Nokia Technologies Oy, Espoo (FI)

( * ) Notice: Subject to any disclaimer, the term of this patent is extended or adjusted under 35 U.S.C. 154(b) by 90 days.

(21) Appl. No.: 18/411,413

(22) Filed: Jan. 12, 2024

(65) Prior Publication Data
US 2024/0250810 A1 Jul. 25, 2024

(30) Foreign Application Priority Data
Jan. 25, 2023 (EP) ..................................... 23305092

(51) Int. Cl.
*H04L 9/08* (2006.01)

(52) U.S. Cl.
CPC ................... *H04L 9/0852* (2013.01)

(58) Field of Classification Search
CPC ... H04L 9/0852; H04L 9/0858; H04L 9/0855; H04L 9/085; H04L 9/0866; H04L 9/0869
See application file for complete search history.

(56) References Cited

U.S. PATENT DOCUMENTS

| 8,483,394 B2 * | 7/2013 | Nordholt ............... H04L 63/062 380/278 |
| 8,929,554 B2 * | 1/2015 | Hughes ................. H04L 9/0852 380/263 |
| 10,567,169 B2 | 2/2020 | Hong et al. |
| 2017/0126654 A1 | 5/2017 | Fu |

FOREIGN PATENT DOCUMENTS

| CN | 107493168 B | 10/2019 |
| CN | 111585752 A | 8/2020 |
| EP | 2622784 B1 | 3/2021 |
| GB | 2503045 B | 5/2014 |
| WO | 2012/044855 A2 | 4/2012 |

OTHER PUBLICATIONS

"Quantum key distribution", Wikipedia, Retrieved on Dec. 27, 2023, Webpage available at : https://en.wikipedia.org/wiki/Quantum_key_distribution.

(Continued)

*Primary Examiner* — Baotran N To
(74) *Attorney, Agent, or Firm* — Nokia Technologies Oy

(57) ABSTRACT

For Bob's authentication to Alice, Alice sends to Bob randomly selected indexes via the classical channel between Alice and Bob. In response, Bob extracts, from the sequences of qubit-related data generated by Bob and based on the randomly selected indexes received from Alice, subsequences of qubit-related data (e.g. including binary axis identifiers and bit values) and Bob sends the extracted subsequences via the classical channel. At least one of sent subsequences may be encrypted with a shared secret cryptographic key. Then Alice can authenticate Bob on the basis of a number of errors computed based on the decrypted subsequences received from Bob.

20 Claims, 7 Drawing Sheets

(56) References Cited

OTHER PUBLICATIONS

"Man-in-the-middle attack", Wikipedia, Retrieved on Dec. 27, 2023, Webpage available at : https://en.wikipedia.org/wiki/Man-in-the-middle_attack.

"Quantum Internet Research Group (qirg)", Datatracker, Retrieved on Dec. 27, 2023, Webpage available at : https://datatracker.ietf.org/rg/qirg/about/.

Kozlowski et al., "Architectural Principles for a Quantum Internet", RFC 9340, Internet Research Task Force (IRTF), Mar. 2023, pp. 1-37.

Wang et al., "Application Scenarios for the Quantum Internet", RFC 9340, QIRG, Internet-Draft, Oct. 16, 2023, 31 pages.

"ETSI—Our group on Quantum Key Distribution for Users (QKD)", ETSI, Retrieved on Dec. 27, 2023, Webpage available at : https://www.etsi.org/committee/1430-qkd.

Lucamarini et al., "Implementation Security of Quantum Cryptography Introduction, challenges, solutions Quantum Cryptography", ETSI White Paper No. 27, First edition—Jul. 2018, pp. 1-27.

Campagna et al., "Quantum Safe Cryptography and Security An introduction, benefits, enablers and challenges", ETSI White Paper No. 8, Jun. 2015, 64 pages.

"Quantum Key Distribution (QKD); Security Proofs", ETSI GS QKD 005, V1.1.1, Dec. 2010, pp. 1-21.

Bennett et al., "Quantum cryptography: Public-key distribution and coin tossing", International Conference on Computers, Systems & Signal Processing, vol. 1, Dec. 10-12, 1984, pp. 175-179.

"BB84", Wikipedia, Retrieved on Dec. 27, 2023, Webpage available at : https://en.wikipedia.org/wiki/BB84.

Ekert, "Quantum cryptography based on Bell's theorem", Physical Review Letters, vol. 67, No. 6, Aug. 5, 1991, pp. 661-663.

Gyongyosi et al., "A Survey on Quantum Key Distribution", Infocommunications Journal, vol. XI, No. 2, Jun. 2019, pp. 14-21.

Sharma et al., "A Survey on Quantum Key Distribution", International Conference on Issues and Challenges in Intelligent Computing Techniques (ICICT), Sep. 27-28, 2019, 4 pages.

Mehic et al., "Quantum Key Distribution: A Networking Perspective", ACM Computing Surveys, vol. 53, No. 5, Article No. 96, Sep. 2020, pp. 1-41.

Zhou et al., "Cross-center quantum identification scheme based on teleportation and entanglement swapping", Optics Communications, vol. 254, No. 4-6, Oct. 15, 2005, pp. 380-388.

"No-cloning theorem", Wikipedia, Retrieved on Dec. 27, 2023, Webpage available at : https://en.wikipedia.org/wiki/No-cloning_theorem.

"Qubit", Wikipedia, Retrieved on Dec. 27, 2023, Webpage available at : https://en.wikipedia.org/wiki/Qubit.

"Bell state", Wikipedia, Retrieved on Dec. 27, 2023, Webpage available at : https://en.wikipedia.org/wiki/Bell_state.

"Aspect's experiment", Wikipedia, Retrieved on Dec. 27, 2023, Webpage available at : https://en.wikipedia.org/wiki/Aspect%27s_experiment.

"ID Quantique, SK Telecom & Nokia Secure Optical Transport System Using Quantum Key Distribution (QKD)", ID Quantique, Retrieved on Dec. 27, 2023, Webpage available at : https://www.idquantique.com/idq-sk-telecom-nokia-secure-optical-transport-system-using-qkd/.

"Partners", CiViQ, Retrieved on Dec. 27, 2023, Webpage available at : https://civiquantum.eu/partners/#nblf.

Liu et al., "Quantum Identity Authentication in the Counterfactual Quantum Key Distribution Protocol", Entropy, vol. 21, No. 5, 2019, pp. 1-19.

Laudenbach et al., "Continuous-Variable Quantum Key Distribution with Gaussian Modulation—The Theory of Practical Implementations", arXiv, May 10, 2018, pp. 1-71.

Extended European Search Report received for corresponding European Patent Application No. 23305092.1, dated Jul. 6, 2023, 6 pages.

Tao et al., "Multi-function Quantum Cryptography Protocol Based on Bell State", International Conference on Artificial Intelligence and Security, 2019, pp. pp. 110-119.

Dutta et al., "A short review on quantum identity authentication protocols: How would Bob know that he is talking with Alice?", arXiv, Dec. 8, 2021, pp. 1-37.

Huang et al., "Authenticated Quantum Key Distribution with Collective Detection using Single Photons", International Journal of Theoretical Physics, vol. 55, May 26, 2016, pp. 4238-4256.

* cited by examiner

IDENTITY AUTHENTICATION FOR QKD PROTOCOLS

TECHNICAL FIELD

Various example embodiments relate generally to QKD protocols and provides methods and apparatus for identity authentication for QKD.

BACKGROUND

Quantum Key Distribution (QKD) is a secure communication method which implements a cryptographic protocol involving components of quantum mechanics. It enables two communicating entities (generally named Alice and Bob) to produce a shared random secret key known only to them, which can then be used to encrypt and decrypt messages. An important and unique property of quantum key distribution is the ability of the two communicating entities to detect the presence of any third party (generally named Eve, for eavesdropper) trying to gain knowledge of the random secret key shared between Alice and Bob. This results from a fundamental aspect of quantum mechanics.

QKD uses two communication channels, a quantum channel and a non-quantum channel, also referred to herein as the "classical channel".

The classical channel is used to exchange information between Alice and Bob. This classical channel is usually not protected from Eve's eavesdropping.

The quantum channel is used to share qubits (e.g. pairs of entangled qubits) between Alice and Bob, each of two entities receiving one qubit of each pair. This quantum channel is physically protected from Eve's eavesdropping by quantum physics fundamental limits, "protection" meaning here that Alice and Bob can statistically detect Eve's eavesdropping using QKD protocols. QKD protocols ensure that Alice and Bob statistically detect Eve's eavesdropping if Eve intercepts and measures some qubits on the quantum channel.

One key step in the global QKD protocols is identity authentication. Without identity authentication, the eavesdropper (Eve) can fake the quantum and classical communications between Alice and Bob using man-in-the-middle attacks to intercept all the communications, letting each communicating entity believe Eve is respectively Bob and/or Alice. Such an identity authentication is required to make QKD effective.

The problem identity authentication may be solved by using classical identity authentication mechanisms using the classical channel. However if the classical channel is compromised, then the identity authentication may also be compromised.

The problem identity authentication may be solved by using some other quantum channels that are different from the quantum communication channel, but these other quantum channels are not authenticated, thus requiring to trust a third party.

There appears a need for an improved identity authentication mechanism.

SUMMARY

The scope of protection is set out by the independent claims. The embodiments, examples and features, if any, described in this specification that do not fall under the scope of the protection are to be interpreted as examples useful for understanding the various embodiments or examples that fall under the scope of protection.

According to a first aspect, a method comprises: obtaining, by a first entity, a first sequence of first binary axis identifiers randomly selected by the first entity and a second sequence of first bit values randomly generated by the first entity for the respective first binary axis identifiers; randomly selecting, by the first entity, a first series of indexes defining a first subsequence of the first sequence and a second subsequence of the second sequence; sending, by the first entity to a second entity, via a non-quantum channel, the first series of indexes; receiving, by the first entity from the second entity, via the non-quantum channel, a third subsequence of a third sequence of second binary axis identifiers randomly selected by the second entity and a fourth subsequence of a fourth sequence of second bit values randomly generated by the second entity for the respective second binary axis identifiers in the third sequence, wherein the third respectively fourth subsequence is defined in the third respectively fourth sequence by the first series of indexes; wherein the second and fourth sequences have been generated using a quantum channel between the first entity and the second entity such that pairs of first and second bit values of same index generated for the same corresponding axis are equal, wherein at least one of the third and fourth subsequences is encrypted; decrypting the at least one of the third and fourth subsequences that is encrypted; authenticating the second entity by the first entity on the basis of a number of errors, wherein the number of errors is computed based on a number of pairs of first and second bit values of same index in the second and fourth subsequences that are not equal among the pairs of first and second bit values of same index for which the corresponding axes in the first and third subsequences are the same.

At least one of the third and fourth subsequences may be received in encrypted form, wherein the at least one of the third and fourth subsequences that is encrypted may be decrypted using at least one first cryptographic key shared between the first and second entities.

Each of the third and fourth subsequences may be received in encrypted form and may be decrypted using one of the at least one first cryptographic key using one-time pad. The at least one of the third and fourth subsequences that is encrypted may be decrypted using one-time pad.

The first series of indexes may be encrypted, before transmission via the non-quantum channel, using a second cryptographic key shared between the first and second entities. The first series of indexes may be encrypted using the second cryptographic key using one-time pad.

Authenticating the second entity by the first entity may be performed on the basis of a ratio of the number of errors over the number of indexes in the first series of indexes. The second entity may be authenticated by the first entity if the ratio is below an authentication threshold beyond which an eavesdropper is deemed present with a given probability.

The method may comprise: receiving, by the first entity from the second entity, via the non-quantum channel, a second series of indexes randomly selected by the second entity; sending, by the first entity to the second entity, via the non-quantum channel, a fifth subsequence of the first sequence and a sixth subsequence of the second sequence, wherein the fifth respectively sixth subsequence is identified in the first respectively second sequence by the second series of indexes, wherein at least one of the fifth and sixth subsequences is sent in encrypted form.

At least one of the fifth and sixth subsequences may be encrypted before transmission using at least one third cryptographic key shared between the first and second entities. At least one of the fifth and sixth subsequences may be encrypted using a one-time pad.

The second series of indexes may be received in encrypted form and the method may comprise: decrypting the second series of indexes using a fourth cryptographic key shared between the first and second entities. The second series of indexes is decrypted using one-time pad.

At least one of the first, second, third and fourth subsequences may be a reordered subsequence that is reordered as a function of the order in which the indexes of the first series of indexes are randomly selected.

At least one of the fifth and sixth subsequences may be a reordered subsequence that is reordered as a function of the order in which the indexes of the second series of indexes are randomly selected.

According to another aspect, an apparatus comprises means for performing a method comprising: obtaining, by a first entity, a first sequence of first binary axis identifiers randomly selected by the first entity and a second sequence of first bit values randomly generated by the first entity for the respective first binary axis identifiers; randomly selecting, by the first entity, a first series of indexes defining a first subsequence of the first sequence and a second subsequence of the second sequence; sending, by the first entity to a second entity, via a non-quantum channel, the first series of indexes; receiving, by the first entity from the second entity, via the non-quantum channel, a third subsequence of a third sequence of second binary axis identifiers randomly selected by the second entity and a fourth subsequence of a fourth sequence of second bit values randomly generated by the second entity for the respective second binary axis identifiers in the third sequence, wherein the third respectively fourth subsequence is defined in the third respectively fourth sequence by the first series of indexes; wherein the second and fourth sequences have been generated using a quantum channel between the first entity and the second entity such that pairs of first and second bit values of same index generated for the same corresponding axis are equal, wherein at least one of the third and fourth subsequences is encrypted; decrypting the at least one of the third and fourth subsequences that is encrypted; authenticating the second entity by the first entity on the basis of a number of errors, wherein the number of errors is computed based on a number of pairs of first and second bit values of same index in the second and fourth subsequences that are not equal among the pairs of first and second bit values of same index for which the corresponding axes in the first and third subsequences are the same.

The apparatus may comprise means for performing one or more or all steps of the method according to the first aspect. The means may include circuitry configured to perform one or more or all steps of a method according to the first aspect. The means may include at least one processor and at least one memory storing instructions that, when executed by the at least one processor, cause the apparatus to perform one or more or all steps of a method according to the first aspect.

According to another aspect, an apparatus comprises at least one processor and at least one memory storing instructions that, when executed by the at least one processor, cause the apparatus to perform: obtaining, by a first entity, a first sequence of first binary axis identifiers randomly selected by the first entity and a second sequence of first bit values randomly generated by the first entity for the respective first binary axis identifiers; randomly selecting, by the first entity, a first series of indexes defining a first subsequence of the first sequence and a second subsequence of the second sequence; sending, by the first entity to a second entity, via a non-quantum channel, the first series of indexes; receiving, by the first entity from the second entity, via the non-quantum channel, a third subsequence of a third sequence of second binary axis identifiers randomly selected by the second entity and a fourth subsequence of a fourth sequence of second bit values randomly generated by the second entity for the respective second binary axis identifiers in the third sequence, wherein the third respectively fourth subsequence is defined in the third respectively fourth sequence by the first series of indexes; wherein the second and fourth sequences have been generated using a quantum channel between the first entity and the second entity such that pairs of first and second bit values of same index generated for the same corresponding axis are equal, wherein at least one of the third and fourth subsequences is encrypted; decrypting the at least one of the third and fourth subsequences that is encrypted; authenticating the second entity by the first entity on the basis of a number of errors, wherein the number of errors is computed based on a number of pairs of first and second bit values of same index in the second and fourth subsequences that are not equal among the pairs of first and second bit values of same index for which the corresponding axes in the first and third subsequences are the same.

The instructions, when executed by the at least one processor, may cause the apparatus to perform one or more or all steps of a method according to the first aspect.

According to another aspect, a computer program comprises instructions that, when executed by an apparatus, cause the apparatus to perform: obtaining, by a first entity, a first sequence of first binary axis identifiers randomly selected by the first entity and a second sequence of first bit values randomly generated by the first entity for the respective first binary axis identifiers; randomly selecting, by the first entity, a first series of indexes defining a first subsequence of the first sequence and a second subsequence of the second sequence; sending, by the first entity to a second entity, via a non-quantum channel, the first series of indexes; receiving, by the first entity from the second entity, via the non-quantum channel, a third subsequence of a third sequence of second binary axis identifiers randomly selected by the second entity and a fourth subsequence of a fourth sequence of second bit values randomly generated by the second entity for the respective second binary axis identifiers in the third sequence, wherein the third respectively fourth subsequence is defined in the third respectively fourth sequence by the first series of indexes; wherein the second and fourth sequences have been generated using a quantum channel between the first entity and the second entity such that pairs of first and second bit values of same index generated for the same corresponding axis are equal, wherein at least one of the third and fourth subsequences is encrypted; decrypting the at least one of the third and fourth subsequences that is encrypted; authenticating the second entity by the first entity on the basis of a number of errors, wherein the number of errors is computed based on a number of pairs of first and second bit values of same index in the second and fourth subsequences that are not equal among the pairs of first and second bit values of same index for which the corresponding axes in the first and third subsequences are the same.

The instructions may cause the apparatus to perform one or more or all steps of a method according to the first aspect.

According to another aspect, a non-transitory computer readable medium comprises program instructions stored thereon for causing an apparatus to perform at least the following: obtaining, by a first entity, a first sequence of first binary axis identifiers randomly selected by the first entity and a second sequence of first bit values randomly generated by the first entity for the respective first binary axis identifiers; randomly selecting, by the first entity, a first series of indexes defining a first subsequence of the first sequence and a second subsequence of the second sequence; sending, by the first entity to a second entity, via a non-quantum channel, the first series of indexes; receiving, by the first entity from the second entity, via the non-quantum channel, a third subsequence of a third sequence of second binary axis identifiers randomly selected by the second entity and a fourth subsequence of a fourth sequence of second bit values randomly generated by the second entity for the respective second binary axis identifiers in the third sequence, wherein the third respectively fourth subsequence is defined in the third respectively fourth sequence by the first series of indexes; wherein the second and fourth sequences have been generated using a quantum channel between the first entity and the second entity such that pairs of first and second bit values of same index generated for the same corresponding axis are equal, wherein at least one of the third and fourth subsequences is encrypted; decrypting the at least one of the third and fourth subsequences that is encrypted; authenticating the second entity by the first entity on the basis of a number of errors, wherein the number of errors is computed based on a number of pairs of first and second bit values of same index in the second and fourth subsequences that are not equal among the pairs of first and second bit values of same index for which the corresponding axes in the first and third subsequences are the same.

The program instructions may cause the apparatus to perform one or more or all steps of a method according to the first aspect.

BRIEF DESCRIPTION OF THE DRAWINGS

Example embodiments will become more fully understood from the detailed description given herein below and the accompanying drawings, which are given by way of illustration only and thus are not limiting of this disclosure.

Figure 1:
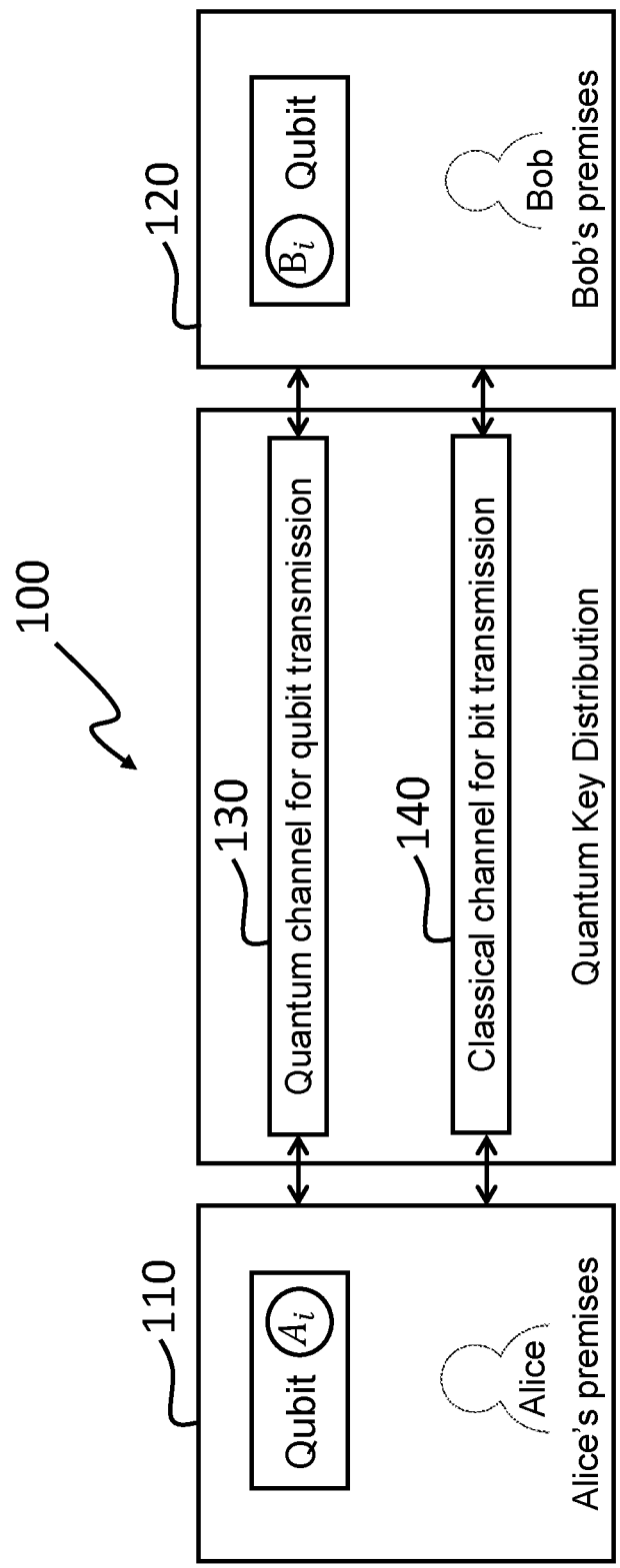
FIG. 1 represents schematically a system for QKD implementation according to an example.

It should be noted that these drawings are intended to illustrate various aspects of devices, methods and structures used in example embodiments described herein. The use of similar or identical reference numbers in the various drawings is intended to indicate the presence of a similar or identical element or feature.

DETAILED DESCRIPTION

Detailed example embodiments are disclosed herein. However, specific structural and/or functional details disclosed herein are merely representative for purposes of describing example embodiments and providing a clear understanding of the underlying principles. However these example embodiments may be practiced without these specific details. These example embodiments may be embodied in many alternate forms, with various modifications, and should not be construed as limited to only the embodiments set forth herein. In addition, the figures and descriptions may have been simplified to illustrate elements and/or aspects that are relevant for a clear understanding of the present invention, while eliminating, for purposes of clarity, many other elements that may be well known in the art or not relevant for the understanding of the invention.

One or more example embodiments describe methods and apparatuses for identity authentication for QKD protocols, using the quantum and classical channels and referred herein as the QIA protocol (Quantum Identity Authentication).

In a QKD set-up, the classical channel is authenticated, for example using classical asymmetric cryptography (public/private keys). But the QIA protocol process disclosed herein does not require that the classical channel is authenticated beforehand. The goal of the QIA protocol is to authenticate both the quantum channel and the classical channel.

According to the QIA protocol, qubits (e.g. qubits and/or pairs or entangled qubits) are initially shared between Alice and Bob through the quantum channel. Each of Alice and Bob generates, on his/her side, sequences of qubit-related data (including binary axis identifiers and bit values) related to the shared qubits. Alice and Bob can be mutually authenticated by using one or more shared cryptographic secret keys (e.g. random keys) to encrypt and share, through the classical channel, subsequences extracted from the sequences of qubit-related data. The identity authentication is performed based on the received subsequences.

During the QIA protocol process for Bob's authentication to Alice, Alice sends to Bob randomly selected indexes via the classical channel between Alice and Bob. In response, Bob extracts, from the sequences of qubit-related data generated by Bob and based on the randomly selected indexes received from Alice, subsequences of qubit-related data (including binary axis identifiers and bit values) and Bob sends the extracted subsequences via the classical channel. At least one of sent subsequences may be encrypted with a shared secret cryptographic key. Then Alice can authenticate Bob on the basis of a number of errors computed based on the decrypted subsequences received from Bob.

In a symmetrical way, Bob sends to Alice randomly selected indexes via the classical channel between Bob and Alice. In response, Alice extracts, from the sequences of qubit-related data generated by Alice and based on the randomly selected indexes received from Bob, subsequences of qubit-related data (including binary axis identifiers and bit values) and Alice sends the extracted subsequences via the classical channel. At least one of sent subsequences may be encrypted with a shared secret cryptographic key. Then Bob can authenticate Alice on the basis of a number of errors computed based on the decrypted subsequences received from Alice.

The one or more secret cryptographic keys shared between Alice and Bob, may be shared out-of-band, i.e. without using the quantum channel or the classical channel. This secret cryptographic keys may be physically shared between Alice and Bob, for example when Alice and Bob meet in a same location.

The total length of the one or more secret cryptographic keys (e.g. random keys) is much shorter than the length of the future random shared secret keys that will be created by the QKD protocol after the QIA protocol. The output of this QIA protocol is an evaluation of an upper bound of the level of potential eavesdropping in the quantum channel, whatever the techniques used by the eavesdropper(s) may be, including "man-in-the-middle" methods.

FIG. 1 represents schematically a system 100 for QKD implementation according to an example.

The generic system for Quantum Key Distribution (QKD) comprises a quantum channel 130 for qubit transmission and a classical channel 140 for classical bit transmission, both channels being established between Alice's premises 110 and Bob's premises 120.

In the context of QKD, it is assumed that an eavesdropper Eve has the following possibilities:

- Eve has complete control of both the classical and the quantum communication channels:
- Eve has unlimited classical and quantum computing resources;
- Eve can read and modify any message sent through the classical communication channel;
- Eve can intercept, measure and replace any qubit shared through the quantum channel;
- In particular, Eve can be in the middle of both classical and quantum channels, communicating with both Alice and Bob, misleading them to believe they are communicating together rather than with Eve;

Eve is however limited by the theoretical impossibilities of quantum physics, such as the "no cloning" theorem. Also Eve has no access to information stored only on Alice and Bob's premises. Eve only knows what can be inferred through eavesdropping the communication channels.

A model used to define the QIA protocol is now presented. The Hilbert space may be used for modeling purpose but a simplified one that suffices to correctly describe what happens.

A sequence of qubits (e.g. qubits and/or pairs or entangled qubits) are initially shared between Alice and Bob through the quantum channel.

In quantum computing, a qubit is a two-state (or two-level) quantum-mechanical system. The axes used for measurement or generation of the qubits may be axes of the quantum state representation in the Bloch sphere.

For each shared qubit, a pair of binary axis identifier and bit value with index i generated by Alice (A), respectively Bob (B), and noted $(m_i^A, b_i^A)$ respectively $(m_i^B, b_i^B)$. The pairs are such that:

Two axes may be used for generating (e.g. creating or measuring) the qubits, where a first axis z (or any other first measurement parameter) is identified by a binary axis identifier: $m_i^A=0$ (respectively $m_i^B=0$) and a second axis y (or any measurement parameter that is "complementary" to the first measurement parameter) is identified by a binary axis identifier $m_i^A=1$ (respectively $m_i^B=1$), the axis to be used being selected uniformly at random without coordination between Alice and Bob;

The generated bit values are such that $b_i^A=0$ (respectively $b_i^B=0$) or 1 (respectively $b_i^B=1$) with 50% probability, keeping in mind that $b_i^A$ and $b_i^B$ are not independent (the values 0 and 1 are conventions, we just attribute these values in such a way that the formulas for the correlation below are correct).

In this context, "complementarity" is a conceptual aspect of quantum mechanics. According to the complementarity principle, objects have certain pairs of complementary properties which cannot all be observed or measured simultaneously.

The correlation between the qubit-related sequences generated by Alice and Bob (according to quantum mechanics, assuming that there is no perturbation due to noise or eavesdropper) is such that:

(i) if Alice and Bob choose the same axis (i.e. $m_i^A=m_i^B$) then the probability that the corresponding generated bit values are equal is 100%, i.e.:

$$m_i^A = m_i^B \Rightarrow 100\%(b_i^A = b_i^B)$$

with a probability of 50% that the bit values are equal to 1 (or respectively to 0), i.e.:

$$50\%(b_i^A = b_i^B = 1) + 50\%(b_i^A = b_i^B = 0)$$

(ii) if Alice and Bob choose different axes (i.e. $m_i^A \neq m_i^B$) then the probability that the corresponding generated bit values are equal is 50% and the probability that the corresponding generated bit values are not equal is also 50%, i.e.

$$m_i^A \neq m_i^B \Rightarrow 50\%(b_i^A = b_i^B) + 50\%(b_i^A \neq b_i^B)$$

with a probability of 25% for each pair of bit values in the set {(0, 0), (0, 1), (1, 0), (1, 1)}, i.e.:

$$25\%(b_i^A = x, b_i^B = y) \text{ for each } (x, y) \in \{(0, 0), (0, 1), (1, 0), (1, 1)\}.$$

QKD exploits the randomness of the measured bit values as described above in (i) and the correlation between the measurements when the same axis is used as described in (ii) to produce shared random keys.

Figure 2A:
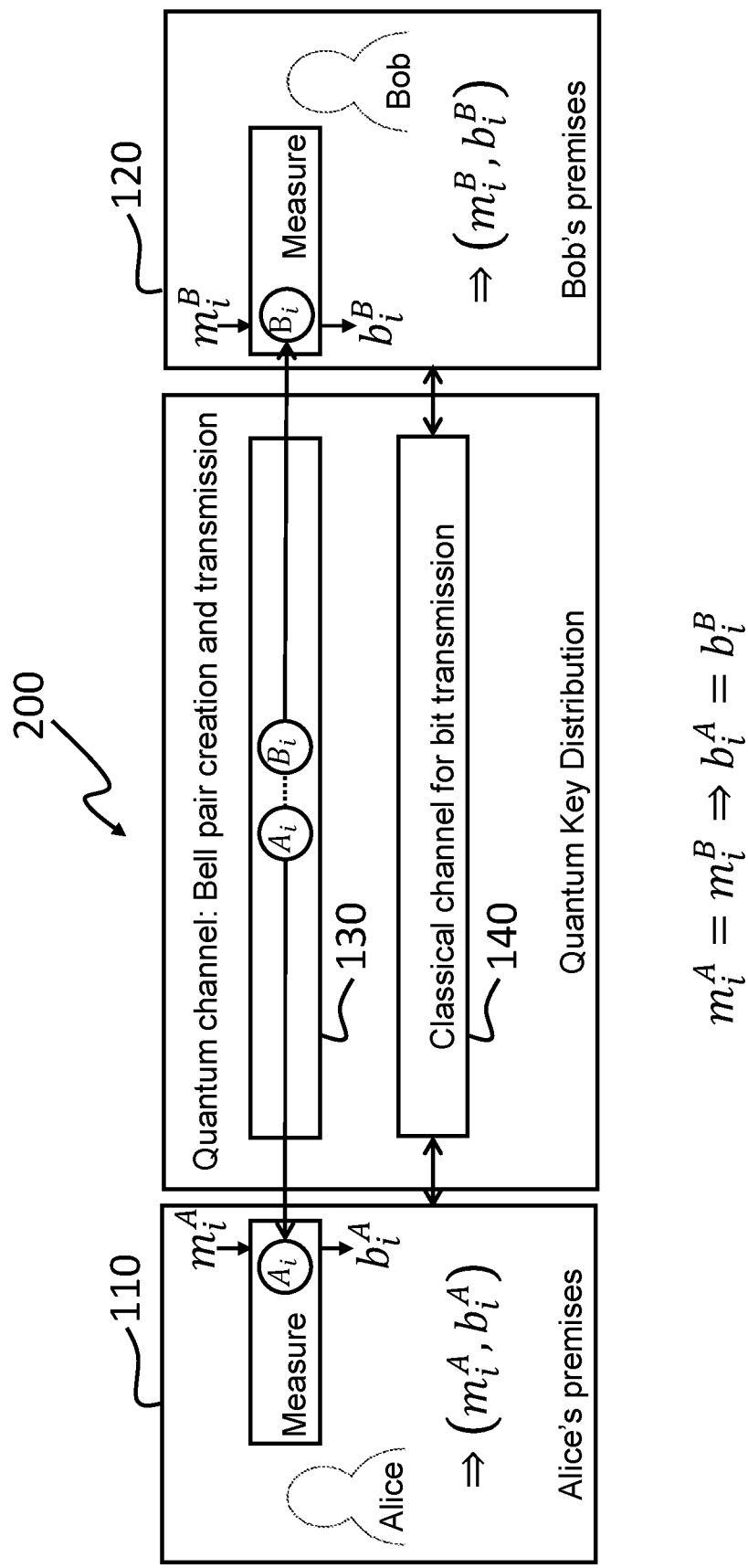
FIG. 2A illustrates how Alice and Bob may share qubits using a quantum channel according to an embodiment.

FIG. 2A illustrates how Alice (hereafter entity A) and Bob (hereafter entity B) may share qubits using a quantum channel according to an embodiment.

A first way to use the quantum channel is to create a Bell pair of entangled qubits $A_i$ and $B_i$ in a quantum network or, equivalently, in the middle of a quantum link, the qubit $A_i$ being sent to the entity A (Alice) and the qubit $B_i$ being sent to the entity B (Bob). Then, in their premises, each entity (Alice, respectively Bob) randomly chooses an axis measurement $m_i^A$ (respectively $m_i^B$) among two possible axes and obtains by the measurement a random bit value $b_i^A$ (respectively $b_i^B$).

This operation is repeated for a sequence of Bell pairs of entangled qubits $A_i$ and $B_i$, where i is the index in the sequence. Thus each entity A (respectively B) generates (in this example by measurement) on its side two qubit-related data sequences including:

a sequence of binary axis identifiers $m_i^A$ (respectively $m_i^B$) randomly selected by the entity A (respectively B); and a sequence of bit values $b_i^A$ (respectively $b_i^B$) randomly generated by the entity A (respectively B) for the associated binary axis identifiers $m_i^A$ (respectively $m_i^B$) of same index.

Figure 2B:
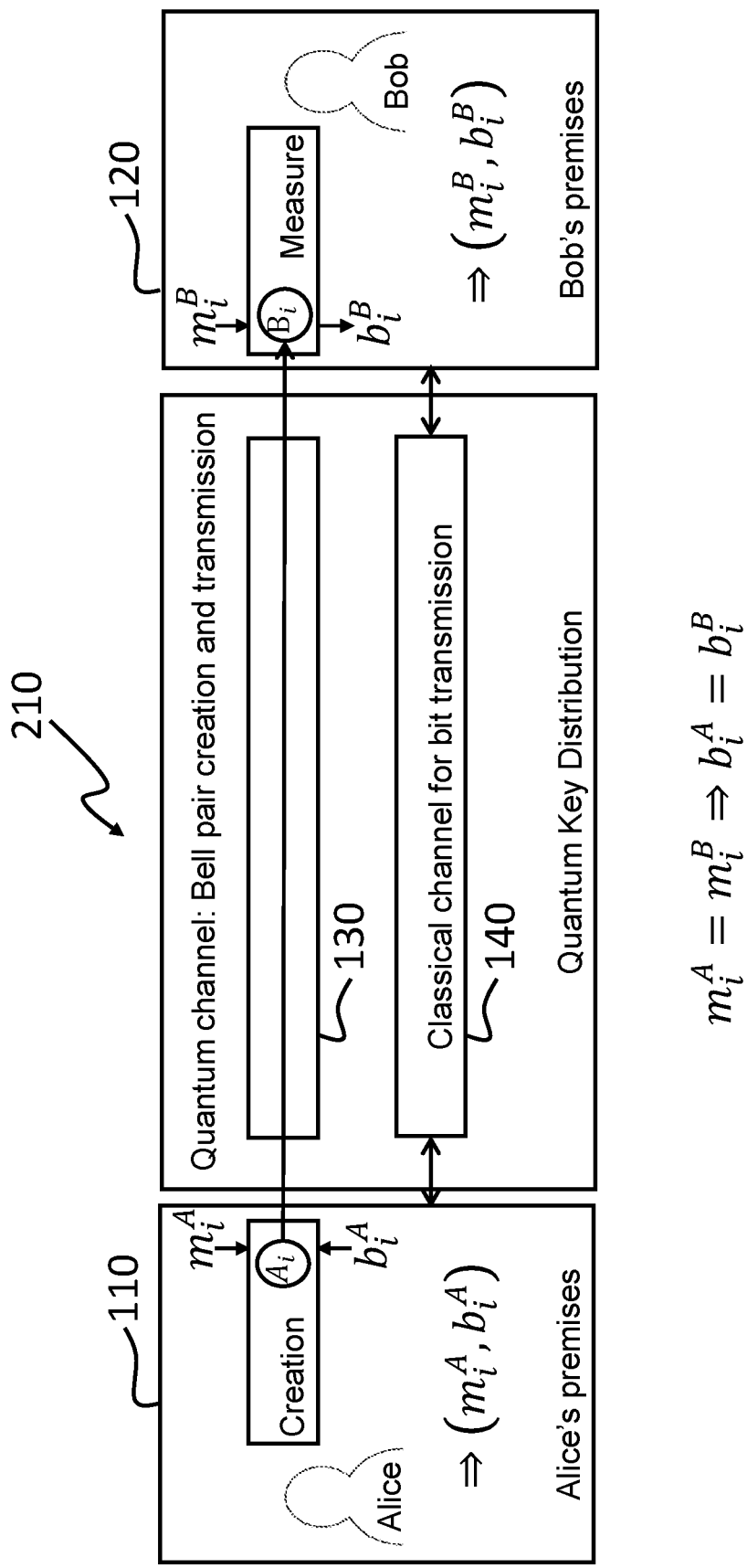
FIG. 2B illustrates how Alice and Bob may share qubits using a quantum channel according to an embodiment.

FIG. 2B illustrates how Alice and Bob may share qubits using a quantum channel according to an embodiment.

A second way to use the quantum channel is that the entity A (for example Alice) creates in her premises a qubit $A_i$ according to some random choices of axis $m_i^A$ and generates an associated bit value $b_i^A$, sends the qubit $A_i$ to the entity B (for example Bob) who, in his premises, receives it ($B_i=A_i$), randomly chooses an axis measurement $m_i^B$ and obtains by the measurement a random bit value $b_i^B$.

This operation is repeated for a sequence of qubits $A_i$ where i is the index in the sequence. Thus each entity A (respectively B) generates on its side two qubit-related data sequences including:

a sequence of binary axis identifiers $m_i^A$ (respectively $m_i^B$) randomly selected by the entity A (respectively B); and a sequence of bit values $b_i^A$ (respectively $b_i^B$) randomly generated by the entity A (respectively B) for the associated binary axis identifiers $m_i^A$ (respectively $m_i^B$) of same index.

In this example, a bit value measured by B (respectively A) is random, but if the axes match between A and B, the bit value always corresponds to the one chosen randomly by A (respectively B).

The qubit creation in Alice's premises may be done either by using a Bell pair (the Bell pair being created here in Alice's premises), or by changing the state of a known qubit to orient the qubit in the randomly chosen axis with the randomly chosen bit value (like in BB84 protocol, see [BB84]).

This second way of sharing qubits may be of course implemented in the reverse direction, by inverting the roles of Alice and Bob.

In both ways (FIGS. 2A-2B), the outcome is the same, one cannot distinguish which way was used:

If $m_i^A = m_i^B$ then $b_i^A = b_i^B$ with probability 100%;

If $m_i^A \neq m_i^B$ then $b_i^A = b_i^B$ with probability 50% and then $b_i^A \neq b_i^B$ with a probability 50%.

Other QKD transmission schemes than the ones disclosed by FIGS. 2A-2B may be used with the same kind of outcome. Here QKD is performed using discrete variables (DV-QKD, see e.g. [BB84]) but one can also use QKD with continuous variables (CV-QKD, see e.g. [ref.CV-QKD]).

We note M the full set of indexes i and $n_M = |M|$ the number of elements in each sequence $m_i^A$, $m_i^B$, $b_i^A$, $b_i^B$ indexed by $i \in M \cdot n_M = |M|$ is also the number of pairs ($m_i^A$, $b_i^A$) or ($m_i^B$, $b_i^B$).

Each instance of the QIA protocol uses a series of randomly selected indexes for selecting elements in each sequence $m_i^A$, $m_i^B$, $b_i^A$, $b_i^B$ in a given order and thereby defining respective subsequences of each sequence $m_i^A$, $m_i^B$, $b_i^A$, $b_i^B$.

We note $K = \{1, \ldots, n_A\}$ the indexes of the cryptographic keys ($k_j^{B \to A}$, $l_j^{B \to A}$) shared by Alice and Bob. We note $\sigma^A$ the injective function mapping the indexes of the shared cryp-tographic keys to the series of indexes randomly selected by entity A and $\sigma^B$ the injective function mapping the indexes of the shared cryptographic keys to the series of indexes randomly selected by entity B. The number of indexes $n_A$ (respectively $n_B$) selected by entity A (respectively B) may be much lower than $n_M$:

$$n_{\sigma^A} = n_A \ll n_M = |M|$$

$$n_{\sigma^B} = n_B \ll n_M = |M|$$

Figure 3A:
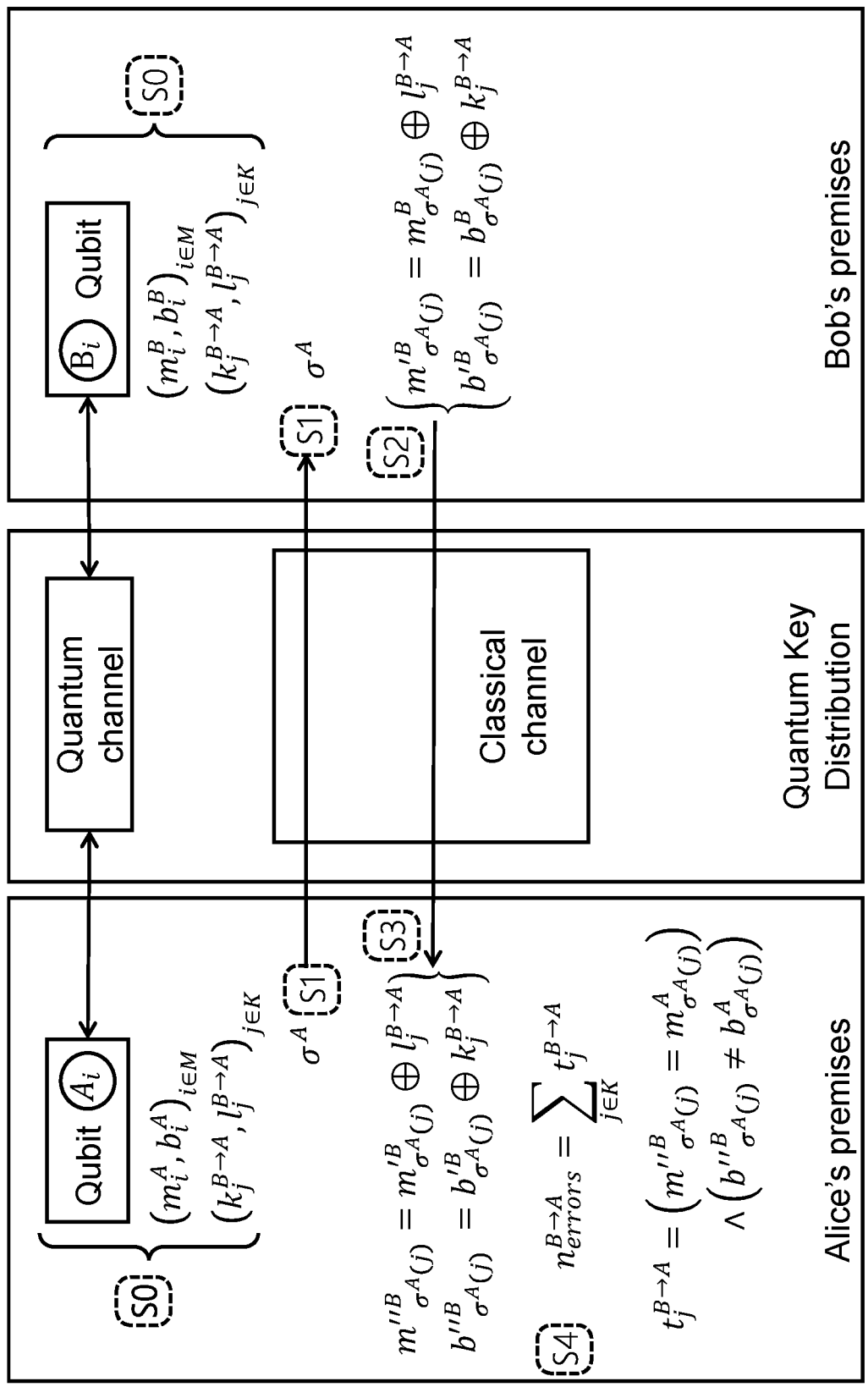
FIG. 3A illustrates aspect of a method for authenticating an entity B by an entity A according to one or more examples.

FIG. 3A illustrates aspect of a method for authenticating an entity B (Bob) by an entity A (Alice) according to one or more examples.

Step S0 corresponds to the initial conditions and the generation of the input data.

In step S0, Alice and Bob share qubits via the quantum channel. Alice generates qubit-related data sequences including a sequence of pairs $(m_i^A, b_i^A)_{i \in M}$, for example according to an embodiment described by reference to FIGS. 2A and 2B. The sequence of pairs $(m_i^A, b_i^A)_{i \in M}$ includes a sequence of bit values $(b_i^A)_{i \in M}$ and a sequence of corresponding binary axis identifiers $(m_i^A)_{i \in M}$.

In step S0, Bob also generates on his side qubit-related data sequences including a sequence of pairs $(m_i^B, b_i^B)_{i \in M}$, for example according to an embodiment described by reference to FIGS. 2A and 2B. The sequence of pairs $(m_i^B, b_i^B)_{i \in M}$ includes a sequence of M bit values $b_i^B$ with $i \in M$ and a sequence of corresponding M binary axis identifiers $m_i^A$ with $i \in M$ In step S0, Alice and Bob share 2 secret cryptographic keys $k^{B \to A}$ and $l^{B \to A}$ of same length $n_A$:

$$(k^{B \to A}, l^{B \to A}) = ((k_i^{B \to A})_{1 \leq i \leq n_A}, (l_i^{B \to A})_{1 \leq i \leq n_A}).$$

In step S0, Alice and Bob may share a third secret cryptographic key $k^{\sigma^A}$.

Each of the shared secret cryptographic keys may be shared out-of-band, without using the quantum channel or the classical channel.

In step S1, Alice randomly chooses $n_A$ indexes among the $n_M$ indexes, thereby defining an index selection function $\sigma^A$ used to obtain a series of indexes corresponding to the randomly selected indexes. The index selection function $\sigma^A$ is a bijection $\sigma^A: K = \{1, \ldots, n_A\} \to I_A$ configured to transform the indexes from the index set $I_A$ including the selected indexes into consecutive integers that are used to index the bits of the shared secret cryptographic keys $k^{B \to A}$ and $l^{B \to A}$. For example: $\sigma^A(1)$ is the first randomly selected index, $\sigma^A(2)$ is the next randomly selected index, etc. Generally $\sigma^A(j)$ is the $j^{th}$ selected index, by considering the order in which the indexes are selected.

In step S1, Alice also sends the series of indexes $\sigma^A(j)$ to Bob. Alice does not reveal any information on the qubit-related data $(m_i^A, b_i^A)_{i \in I_A}$ generated by Alice, only the series of randomly selected indexes $\sigma^A(j)$.

The series of indexes $\sigma^A(j)$ may be sent to Bob in an encrypted form, e.g. using the secret cryptographic key $k^{\sigma^A}$ shared between Alice and Bob. The series of indexes $\sigma^A(j)$ may be encrypted using one-time pad (e.g. using bitwise XOR).

In step S2, Bob does not reveal any information on the qubit-related data sequences generated by Bob ($m_i^B$, $b_i^B$).

But Bob sends to Alice two subsequences $m'^B_{\sigma^A(j)}$ and $b'^B_{\sigma^A(j)}$ of length $n_A$ of the qubit-related data sequences generated by Bob:

$$m'^B_{\sigma^A(j)} = m^B_{\sigma^A(j)} \oplus l^{B \to A}_j$$

$$b'^B_{\sigma^A(j)} = b^B_{\sigma^A(j)} \oplus k^{B \to A}_j$$

where ⊕ denotes the XOR function.

The subsequence $m^B_{\sigma^A(j)}$ is a reordered subsequence of the sequence of M bit values $b^B_i$ (with i∈M) defined by the series of indexes $\sigma^A(j)$ randomly selected by Alice. Likewise, the subsequence $b^B_{\sigma^A(j)}$ is a reordered subsequence of the sequence of M binary axis identifiers $m^A_i$ with (i∈M) defined by the series of indexes $\sigma^A(j)$ randomly selected by Alice.

Each of the two subsequences of length $n_A$ may be encrypted before transmission. In an alternative, only one of the two subsequences may be encrypted before transmission. The encryption of a subsequence may be performed by using one of the shared secret cryptographic keys $k^{B \to A}$ and $l^{B \to A}$.

The encryption technique may be for example the one-time pad (OTP) that uses a single-use pre-shared cryptographic key that is not smaller than the message being sent. In this encryption technique, each bit or character of the data to be encrypted is combined with the corresponding bit or character from the cryptographic key. The combination may be performed using modular addition or a bitwise XOR function.

In step S3, Alice receives the two subsequences $m'^B_{\sigma^A(j)}$ and $b'^B_{\sigma^A(j)}$ each of length $n_A$ and decrypts the (or at least one of the) subsequences $m'^B_{\sigma^A(j)}$ and $b'^B_{\sigma^A(j)}$ that are (is) encrypted using the shared secret cryptographic keys $k^{B \to A}$ and $l^{B \to A}$:

$$m''^B_{\sigma^A(j)} = m'^B_{\sigma^A(j)} \oplus l^{B \to A}_j$$

$$b''^B_{\sigma^A(j)} = b'^B_{\sigma^A(j)} \oplus k^{B \to A}_j$$

In step S4, Alice calculates a number of errors $$n^{B \to A}_{errors} = \sum_{j \in K} t^{B \to A}_j$$

Such that $$t^{B \to A}_j = \left(m''^B_{\sigma^A(j)} = m^A_{\sigma^A(j)}\right) \wedge \left(b''^B_{\sigma^A(j)} \neq b^A_{\sigma^A(j)}\right)$$

where $t^{B \to A}_j$ is equal to 1 if $m''^B_{\sigma^A(j)} = m^A_{\sigma^A(j)}$ and $b''^B_{\sigma^A(j)} \neq b^A_{\sigma^A(j)}$ and equal to 0 otherwise.

The number of errors corresponds to a number of pairs of first and second bit values $b''^B_{\sigma^A(j)}$ and $b^A_{\sigma^A(j)}$ of same index that are not equal ($b''^B_{\sigma^A(j)} \neq b^A_{\sigma^A(j)}$) among the pairs of first and second bit values $b''^B_{\sigma^A(j)}$ and $b^A_{\sigma^A(j)}$ of same index generated for the same axis ($m''^B_{\sigma^A(j)} = m^A_{\sigma^A(j)}$).

Alice can authenticate Bob on the basis of a number of errors $n^{B \to A}_{errors}$. The number of errors may be due either to noise or eavesdropping: the number of errors gives an evaluation of the quantum error rate $$\widehat{QER} = \frac{n_{errors}}{n_A}.$$

Bob is authenticated it the ratio $$\frac{n_{errors}}{n_A}$$

is below an authentication threshold beyond which an eavesdropper is deemed present with a given probability.

Figure 3B:
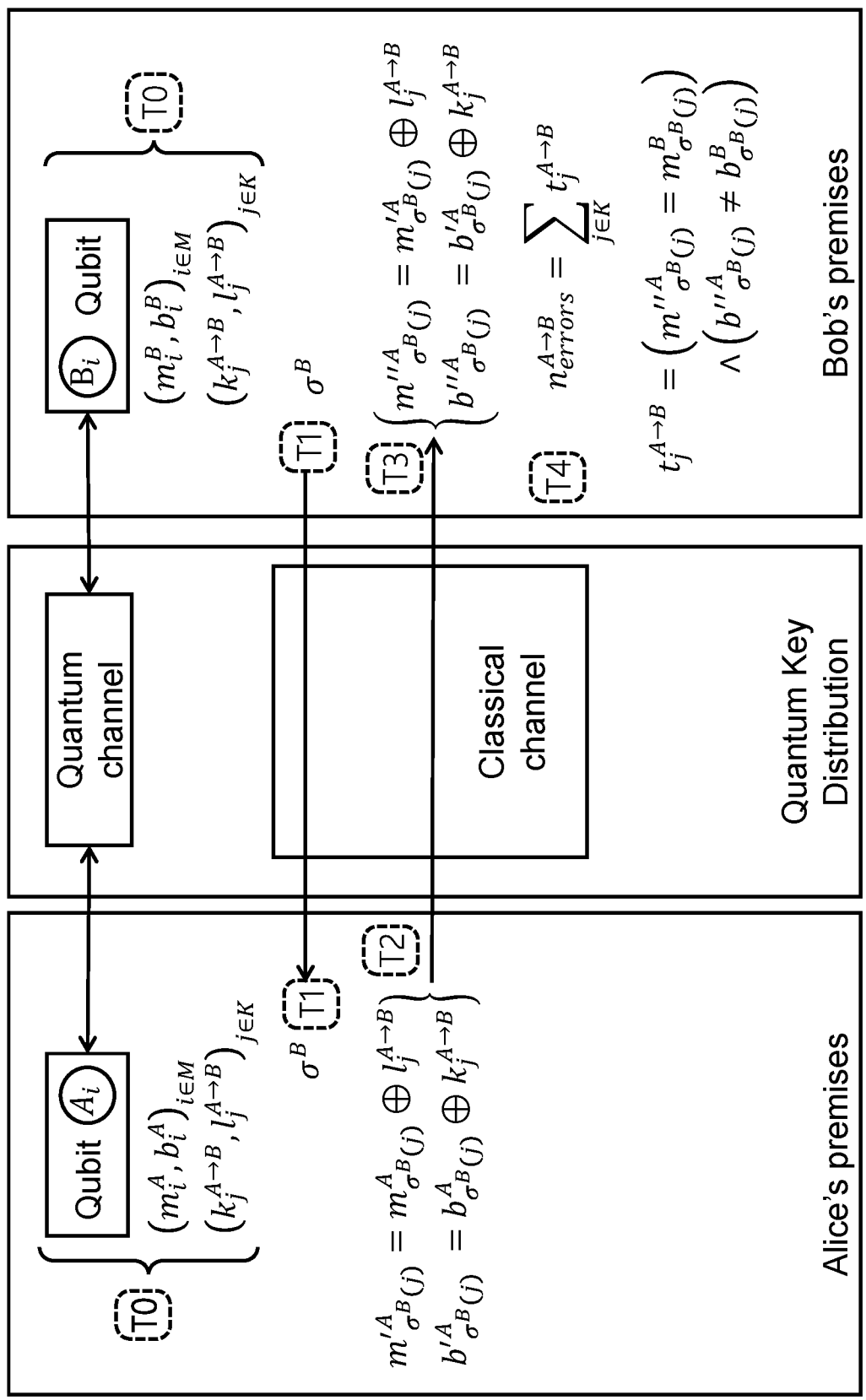
FIG. 3B illustrates aspect of a method for authenticating an entity A by an entity B according to one or more examples.

FIG. 3B illustrates aspect of a method for authenticating an entity A by an entity B according to one or more examples. The method steps are symmetrical to those described above for FIG. 3A. Not all details will be repeated below.

Step T0 corresponds to the initial conditions and the generation of the input data.

In step T0, like for step S0 in FIG. 3A, Bob and Alice share qubits via the quantum channel. Bob generates qubit-related data sequences including a sequence of pairs $(m^B_i, b^B_i)_{i \in M}$. The sequence of pairs $(m^B_i, b^B_i)_{i \in M}$ includes a sequence of bit values $(b^B_i)_{i \in M}$, and a sequence of corresponding binary axis identifiers $(m^B_i)_{i \in M}$.

In step T0, like for step S0 in FIG. 3A, Alice also generates on his side qubit-related data sequences including a sequence of pairs $(m^A_i, b^A_i)_{i \in M}$. The sequence of pairs $(m^A_i, b^A_i)_{i \in M}$ includes a sequence of M bit values $b^A_i$ with i∈M and a sequence of corresponding M binary axis identifiers $m^A_i$ with i∈M In step T0, Bob and Alice share 2 secret cryptographic keys $k^{A \to B}$ and $l^{A \to B}$ of same length $n_B$:

$$\left(k^{A \to B}, l^{A \to B}\right) = \left(\left(k^{A \to B}_i\right)_{1 \leq i \leq n_B}, \left(l^{A \to B}_i\right)_{1 \leq i \leq n_B}\right).$$

The 2 secret cryptographic keys $k^{A \to B}$ and $l^{A \to B}$ are different from those shared in step S0 of FIG. 3A.

In step T0, Bob and Alice may share a third cryptographic key $k^{\sigma^B}$ different from those shared in step S0 of FIG. 3A.

Each of the shared secret cryptographic keys may be shared out-of-band, without using the quantum channel or the classical channel.

In step T1, Bob randomly chooses ng indexes among the $n_M$ indexes, defining thereby an index selection function $\sigma^B$ used to obtain a series of indexes corresponding to the randomly selected indexes. The index selection function $\sigma^B$ is a bijection $\sigma^B$: {1, . . . , $n_B$}→$I_B$ configured to transform the indexes from the index set $I_B$ including the selected indexes into consecutive integers that are used to index the bits of the shared secret cryptographic keys $k^{A \to B}$ and $l^{A \to B}$. For example: $\sigma^B(1)$ is the first randomly selected index, $\sigma^B(2)$ is the next randomly selected index, etc. Generally $\sigma^B(j)$ is the $j^{th}$ selected index, by considering the order in which the indexes are selected.

In step T1, Bob also sends the series of indexes $\sigma^B(j)$ to Alice. Bob does not reveal any information on the qubit-related data $$\left(m^B_i, b^B_i\right)_{i \in I_A}$$

generated by bob, only the series of randomly selected indexes $\sigma^B(j)$.

The series of indexes $\sigma^B(j)$ may be sent to Alice in an encrypted form, e.g. using the secret cryptographic key $k^{\sigma^B}$ shared between Alice and Bob. The series of indexes $\sigma^B(j)$ may be encrypted using one-time pad (e.g. using bitwise XOR).

In step T2, Alice does not reveal any information on the qubit-related data sequences generated by Alice $$\left(m_i^A, b_i^A\right)_{i \in I_B}.$$

But Alice sends to Bob two subsequences $m'^A_{\sigma^B(j)}$ and $b'^A_{\sigma^B(j)}$ of length ng of the qubit-related data sequences generated by Alice:

$$m'^A_{\sigma^B(j)} = m^A_{\sigma^B(j)} \oplus l_j^{A \to B}$$

$$b'^A_{\sigma^B(j)} = b^A_{\sigma^B(j)} \oplus k_j^{A \to B}$$

where $\oplus$ denotes the XOR function.

The subsequence $m^A_{\sigma^B(j)}$ is a reordered subsequence of the sequence of M bit values $b_i^A$ (with $i \in M$) defined by the series of indexes $\sigma^B(j)$ randomly selected by Bob. Likewise, the subsequence $b^A_{\sigma^B(j)}$ is a reordered subsequence of the sequence of M binary axis identifiers $m_i^B$ with ($i \in M$) defined by the series of indexes $\sigma^B(j)$ randomly selected by Bob.

Each of the two subsequences of length $n_B$ may be encrypted before transmission. In an alternative, only one of the two subsequences may be encrypted before transmission. The encryption of a subsequence may be performed by using one of the shared secret cryptographic keys $k^{A \to B}$ and $l^{A \to B}$.

The encryption technique may be for example the one-time pad (OTP) that uses a single-use pre-shared cryptographic key that is not smaller than the message being sent. In this encryption technique, each bit or character of the data to be encrypted is combined with the corresponding bit or character from the cryptographic key. The combination may be performed using modular addition or a bitwise XOR function.

In step T3, Bob receives the two subsequences $m'^A_{\sigma^B(j)}$ and $b'^A_{\sigma^B(j)}$ of length $n_B$ and decrypts the (or at least one of the) subsequences $m'^A_{\sigma^B(j)}$ and $b'^A_{\sigma^B(j)}$ that are (is) encrypted using the shared secret cryptographic keys $k^{A \to B}$ and $l^{A \to B}$:

$$m''^A_{\sigma^B(j)} = m'^A_{\sigma^B(j)} \oplus l_j^{A \to B}$$

$$b''^A_{\sigma^B(j)} = b'^A_{\sigma^B(j)} \oplus k_j^{A \to B}$$

In step T4, Bob calculates a number of errors $$n_{errors}^{A \to B} = \sum_{j \in K} t_j^{A \to B}$$

Such that $$t_j^{A \to B} = \left(m''^A_{\sigma^B(j)} = m^B_{\sigma^B(j)}\right) \wedge \left(b''^A_{\sigma^B(j)} \neq b^B_{\sigma^B(j)}\right)$$

where $t_j^{A \to B}$ is equal to 1 if $m''^A_{\sigma^A(j)} = m^B_{\sigma^A(j)}$ and $b''^A_{\sigma^A(j)} \neq b'^B_{\sigma^A(j)}$ and is equal to 0 otherwise.

The number of errors corresponds to a number of pairs of first and second bit values $b''^A_{\sigma^B(j)}$ and $b^B_{\sigma^B(j)}$ of same index that are not equal ($b''^A_{\sigma^B(j)} \neq b^B_{\sigma^B(j)}$) among the pairs of first and second bit v values $b''^A_{\sigma^B(j)}$ and $b^B_{\sigma^B(j)}$ of same index generated for the same axis ($m''^A_{\sigma^B(j)} = m^B_{\sigma^B(j)}$).

Alice can authenticate Bob on the basis of a number of errors $n_{errors}^{A \to B}$. The number of errors may be due either to noise or eavesdropping: the number of errors gives an evaluation of the quantum error rate $$\overline{QER} = \frac{n_{errors}}{n_B}.$$

Bob is authenticated if the ratio $$\frac{n_{errors}}{n_B}$$

is below an authentication threshold beyond which an eavesdropper is deemed present with a given probability.

In the examples described by reference to FIGS. 3A and 3B, the subsequences are reordered subsequences: the values in a given subsequence are reordered—with respect to the sequence from which the considered subsequence is extracted—as a function of the order in which the indexes of the first or second series of indexes are randomly selected. Alternatively the order in which the indexes of the first or second series of indexes are randomly selected may not be taken into account such that the order of the values in a given subsequence is the same as the order of the corresponding values in the sequence from which the given subsequence is extracted.

The QIA protocol is applied twice, one for authentication of Bob by Alice (FIG. 3A) and one for authentication of Alice by Bob (FIG. 3B).

In steps S0 and T0, all the Bell pairs and/or qubits should preferably be received by Alice and Bob before the start (steps S1 and T1) of the QIA protocol, i.e. before one of the series of indexes is sent by Alice or Bob, in order to authenticate "statistically" the whole set. Measurements on qubits may be done after (the qubits having an index in one of the series of indexes may be measured during step S1 or T1 and the other indexes may be measured even after the QIA protocol), but it is easier and more practical to do them before.

The sharing of the initial secret random keys $k^{A \to B}$, $l^{A \to B}$, $k^{B \to A}$ and $l^{B \to A}$ in steps S0 and T0 is done before the start (before steps S1 and T1) of the QIA protocol.

In an example embodiment, an initial source shared secret cryptographic key $k^{init}$ may be used for generating the shared secret cryptographic keys. The initial source shared secret cryptographic key $k^{init}$ is used only one time (e.g. by using one-time pad) and thrown away after the completion of the steps S4 or T4 (or steps 48A-48B in FIG. 4). This initial source shared secret cryptographic key $k^{init}$ may be split in at least 4 parts to generate the shared cryptographic secret keys $k^{B \to A}$, $l^{B \to A}$, $k^{A \to B}$, $l^{A \to B}$ having the required lengths:

$$k^{init} = (k^{B \to A}, l^{B \to A}, k^{A \to B}, l^{A \to B}) = \left( (k_i^{B \to A})_{1 \le i \le n_A}, (l_i^{B \to A})_{1 \le i \le n_A}, (k_i^{A \to B})_{1 \le i \le n_B}, (l_i^{A \to B})_{1 \le i \le n_B} \right)$$

Likewise the initial source shared secret cryptographic key $k^{init}$ may also be used to generate the shared cryptographic keys $k^{\sigma^B}$ and/or $k^{\sigma^A}$ having the required lengths when the randomly selected indexes are encrypted.

The order between the step of sharing the qubit and the step of sharing the secret cryptographic keys is not important but the shared secret cryptographic keys may be shared before (e.g. a long time before) sharing a set of qubits through quantum channel. The sharing should be done before, either "physically" (e.g. out-of-band) for example when Alice and Bob meet in a same location or by a previous QKD session.

Concerning the selection of the indexes in steps S1 and T1, the indexes $\sigma^A$ and $\sigma^B$ are chosen randomly respectively and independently by Alice and Bob.

Alice chooses the indexes $\sigma^A$, but if Bob would select the same indexes $\sigma^A$, then man-in-the-middle attacks would be possible. Also, because the indexes are randomly selected, this avoids Eve to infer the selection.

The number of randomly selected indexes may be different for Alice and Bob or the same number can be used. Because the selected indexes are chosen randomly, the selected indexes are different, but there may be some common indexes. This is not really important, because the expected proportion of common indexes is very low compared to $n_M$. Nevertheless, in embodiments, the common indexes in $\sigma^A$ and $\sigma^B$ may be removed. For example, if Bob authenticates to Alice is done first, then when authenticating Alice, Bob can remove the indexes that are in common and replace them by other random ones, until Bob gets the right number of indexes.

Alice (respectively Bob) does not send any information about her qubit-related data (e.g. axis identifiers or bit values), but only the indexes Alice (respectively Bob) randomly selected in step S1 (respectively T1): thus Bob (respectively Alice) has no information about these measurements, nor does Eve, whatever the eavesdropping strategy Eve might choose.

Likewise, Bob (respectively Alice) does not send his (her) qubit-related data (e.g. axis identifiers or bit values) in clear, but rather encrypts the qubit-related data generated by Bob (respectively Alice). This ensures that Eve will have no information at all on the real values of his measurements.

By encrypting only one of the qubit related data subsequences ($m_i^B$ or $b_i^B$) generated by Bob (respectively Alice) Eve will have partial information but this may be not enough to attack the QIA protocol. Encrypting both is more secure because Eve will not be able to attack the QIA protocol during the transmission in step S2 or T2 of the qubit related data subsequences if Eve has no information at all. Also the decrypting step S3 or T3 works because the initial secret keys are shared by Alice and Bob.

The goal of step S4 or T4 is to evaluate if there was an error in one given qubit, summing them giving the number of measured errors. The errors may come from noise or eavesdropping, but eavesdropping causes error only with some probabilities.

It is assumed here that, for the QIA protocol, the eavesdropping power of Eve is such that:

Eve can intercept and modify anything in the quantum and classical channel channels;

Eve can get any information on these channel that is allowed by the laws of physics (quantum physics on the quantum channel, theory of the information on the classical channel);

Eve cannot get any information that is kept secret inside Alice's and Bob's premises.

The eavesdropping effect of Eve on the QKD is such that

Eve cannot get any information about what is transmitted in the classical channel because everything is encrypted with the initial source cryptographic key $k^{init}$ that is kept secret inside Alice's and Bob's premises;

Eve cannot get information on the qubits transmitted on the quantum channel which are randomly created or measured (depending on the QKD quantum channel usage scheme) inside Alice's and Bob's premise;

Any perturbations (modification) brought by Eve's actions (including man-in-the-middle attacks) in the quantum channel and/or the classical channel will be statistically detected by the QIA protocol based the numbers of errors $n_{errors}^{B \to A}$ and $n_{errors}^{A \to B}$ that increase proportionally to the level of Eve's interventions.

The authentication threshold (that may be used in steps S4 of FIG. 3A or step T4 of FIG. 3B) may be computed in various manners.

Alice may use this $\overline{QER}$ value to calculate an upper bound $p_{ub}$ for the probability p that the number $n_{eve}$ of eavesdropped qubits in the quantum channel is greater than a threshold $n_{threshold}$, and compares it to a reference value $p_{threshold}$ to validate or reject the authentication: the quantum channel is considered as correctly authenticated if $p_{ub} \le p_{threshold}$, and too corrupted if $p_{ub} > p_{threshold}$.

The computation of $n_{threshold}$ may be performed as described below. The authentication threshold $n_{threshold}$ may be the same for Alice and Bob.

The worst case is when there is no noise and all errors comes from eavesdroppers, the estimated probability of eavesdropping being lower if some errors come from noise.

Knowing the probability of eavesdropping $p_{eve}$, the probability that $n_{eve} > n_{threshold}$ is:

$$p = Prob[n_{eve} > n_{threshold} | p_{eve}]$$

$$p = \sum_{k=n_{threshold}+1}^{n_A} \binom{n_A}{k} p_{eve}^k (1 - p_{eve})^{n_A - k}.$$

For each qubit, if $p_{eve}$ is the probability that the qubit is eavesdropped by Eve, then the induced probability of a quantum error rate (i.e., fraction of indices for which $t_i^{B \to A} = 1$) is $$QER = \frac{1}{8} \times p_{eve},$$

because:
If the axes of measurement by Alice and Bob are the same ($m''^B_i = m^A_i$, with probability $$Prob[m''^B_i = m^A_i] = \frac{1}{2}),$$

when the qubit is measured by Eve, because she does not know what is the axis of measurement chosen by Alice (or Bob), the probability that the qubit measured by Alice (or Bob) is inverted after the measure of Eve is ¼: either she chooses the same axis with probability ½ and the value is not inverted, either she chooses the other axis with probability ½ and the value is inverted with probability ½, giving an overall probability of ¼;

If the axes of measurement by Alice and Bob are different ($m''^B_i \neq m^A_i$, with probability $$Prob[m''^B_i \neq m^A_i] = \frac{1}{2}),$$

the qubits are discarded and Alice and Bob can not say if something is wrong;
Thus $$QER = E[t_i^{B \to A}] = Prob[m''^B_i = m^A_i] \times \frac{p_{eve}}{4} + Prob[m''^B_i \neq m^A_i] \times 0 = \frac{p_{eve}}{8}.$$

Thus we have without noise:

$$p = p_{ub} = f(QER) = \sum_{k=n_{threshold}+1}^{n_A} \binom{n_A}{k} (8 \cdot QER)^k (1 - 8 \cdot QER)^{kn_A - k},$$

and we have with noise $p \leq p_{ub}$.
Thus $$\overline{QER} = \frac{n_{errors}}{n_A}$$

which is an estimator of QER.

The authentication threshold may for example be set to $n_{threshold} = R \times n_A$, where R is potential eavesdropping rate expressed in %.

Figure 4:
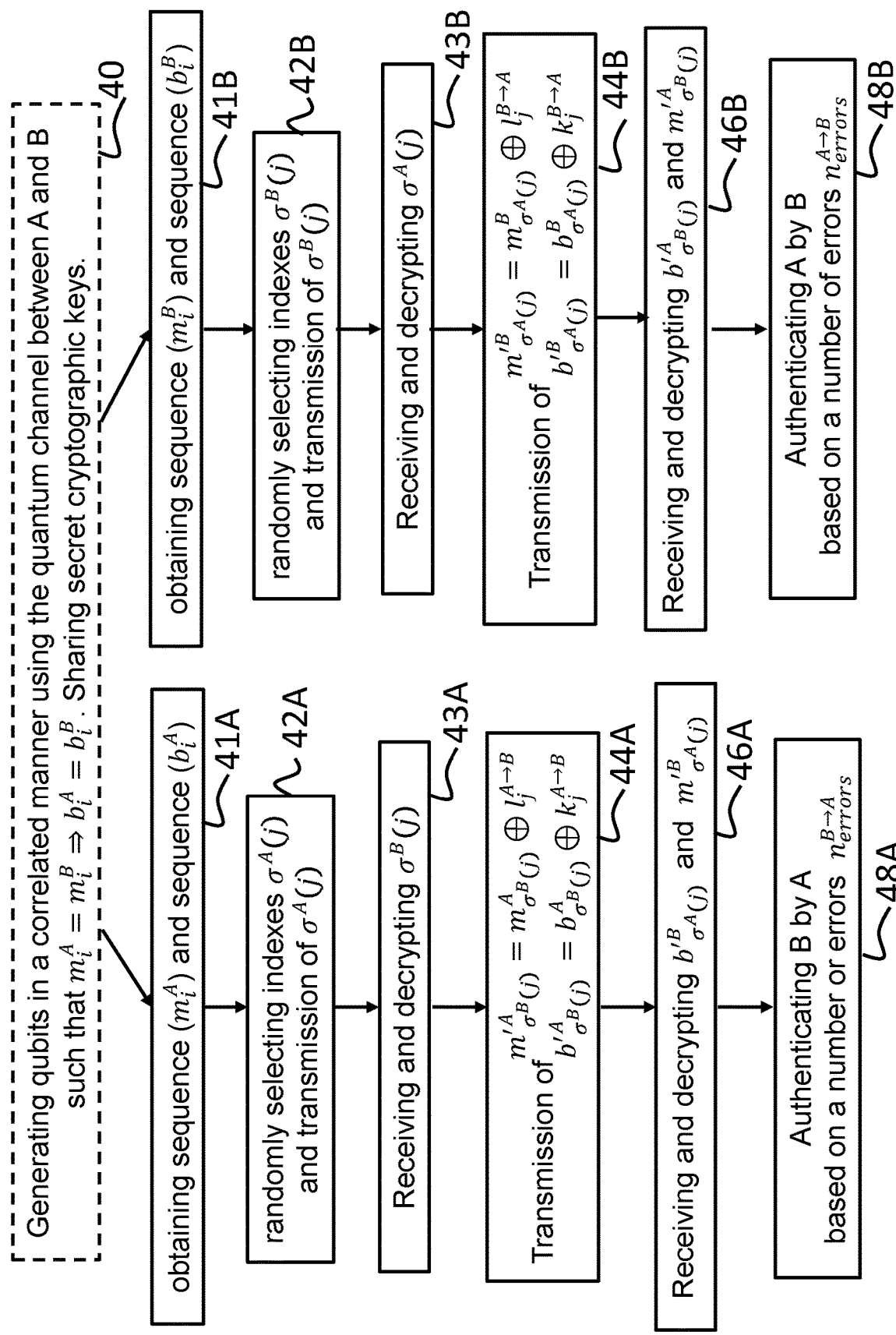
FIG. 4 is a flowchart illustrating a method for mutual authentication of two entities according to an example.

For example, in step S4 or T4:
The authentication threshold may for example be set to $n_{threshold} = 10\% \times n_A$, the privacy amplification step in the QKD method described here after allowing to take care about this potential eavesdropping rate of 10% (10% value is just an example here, other selected values may be 5%, 20%);
$p_{threshold} = 10^{-9}$ as an example; this threshold example approximatively corresponds to the probability to have a deviation greater than or equal to six times the standard deviation of the probability distribution based on a Gaussian approximation of the probability distribution of $n_{errors}$; other selected values may be $10^{-8}$ or $10^{-10}$ selected;

If the level of potential eavesdropping is too high, then the authentication is negative and the QKD cannot be used.
If the quantum error rate evaluated by the QIA protocol is low enough, Alice and Bob may use usual sub-processes of QKD as defined for example by ETSI, such as:
Sifting: Alice and Bob may identify the usable shared bits coming from the remaining shared bits, i.e. the qubit related information $(m^B_i, b^B_i)_{i \in M}$, and $(m^A_i, b^A_i)_{i \in M}$ not transmitted during the QIA protocol, i.e. the qubit related information $(m^B_i, b^B_i)_{i \in M}$ and $(m^A_i, b^A_i)$ for which the indexes are not in the randomly selected indexes.
Error correction: Alice and Bob may correct eventual errors using the remaining shared bits.
Privacy amplification: Alice and Bob may remove any information Eve may have obtained.
Verification: Alice and Bob may verify there is no remaining error on a subset of the shared bits.
New-shared-key building: Alice and Bob may use the remaining shared bits to build a new shared secret key that is much longer than the initial one (part of it may be used for future QKD with QIA protocol, other parts may be used for communication encryption, etc.); if the estimated quantum error rate is too high: The generation of a longer new secret key has failed, either because of the quantum channel noise or the eavesdropper's perturbation are too high.
FIG. 4 is a flowchart illustrating a method for mutual authentication of two entities according to an example.
The steps of the method may be implemented by two entities A and B (e.g. Alice's premises and Bob's premises) according to any example described herein. Steps 41A to 48A are performed by entity A and steps 41B to 48B are performed by entity B, while the initial step 40 is performed in a correlated manner by the two entities A and B. The generation of the qubit related data (bit values and corresponding axis identifiers) is performed in a correlated manner by the two entities A and B using the quantum channel.
While the steps are described in a sequential manner, the man skilled in the art will appreciate that some steps may be omitted, combined, performed in different order and/or in parallel.
This flowchart illustrates the fact that the steps performed by entity A and the steps performed by entity B may be performed in parallel or with some interleaving.
The authentication of B by A and the authentication of A by B may be performed in parallel, in an interleaved fashion.
In an initial step 40, entity A generates qubit-related data sequences including: a sequence of bit values $(b^A_i)_{i \in M}$ (hereafter the second sequence) and a sequence of corresponding binary axis identifiers $(m^A_i)_{i \in M}$ (hereafter the first sequence). In step 40, entity B generates qubit-related data sequences including a sequence of bit values $(b^B_i)_{i \in M}$ (hereafter the fourth sequence) and a sequence of corresponding binary axis identifiers $(m^B_i)_{i \in M}$ (hereafter the third sequence).
The four sequences are generated using a quantum channel between the entity A and the entity B and in a correlated manner such that pairs of first and second bit values $b^A_i$ and $b^B_i$ of same index (in the second and fourth sequences) generated for the same axis are equal.
Secret cryptographic keys are shared between the first and second entities. The shared cryptographic keys may include:
at least one first cryptographic key $k^{B \to A}$ and/or $1^{B \to A}$;
a second cryptographic key $k^{\sigma^A}$;
at least one third cryptographic key $k^{A \to B}$ and/or $1^{A \to B}$.
a fourth cryptographic key $k^{\sigma^B}$.

As will be disclosed below, two series of indexes may be used that include:
- a first series of indexes $\sigma^A(j)$ defined by the index selection function $\sigma^A$;
- a second series of indexes $\sigma^B(j)$ defined by the index selection function $\sigma^B$.

Further sequences and subsequences are used that may include:
- a first sequence of first binary axis identifiers ($m_i^A$), with $i \in M$;
- a second sequence of first bit values (b), with $i \in M$;
- a third sequence of second binary axis identifiers ($m_i^B$) with $i \in M$;
- a fourth sequence of second bit values ($b_i^B$), with $i \in M$;
- a first reordered subsequence $m_{\sigma^A(j)}^A$ of the first sequence;
- a second reordered subsequence $b_{\sigma^A(j)}^A$ of the second sequence;
- a third reordered subsequence $m_{\sigma^A(j)}^B$ of the third sequence;
- a fourth reordered subsequence $b_{\sigma^A(j)}^B$ of the fourth sequence;
- a fifth reordered subsequence $m_{\sigma^B(j)}^A$ of the first sequence;
- a sixth reordered subsequence $b_{\sigma^B(j)}^A$ of the second sequence.

In step 41A, the entity A obtains the first sequence of first binary axis identifiers ($m_i^A$) and the second sequence of first bit values ($b_i^A$). The first binary axis identifiers ($m_i^A$) are randomly selected by the entity A. The first bit values ($b_i^A$) are randomly generated (created or measured according to the quantum channel use case, see FIGS. 2A-2B) by the entity A for the corresponding first binary axis identifiers ($m_i^A$).

In step 42A, the entity A randomly selects a first series of indexes defined by an index selection function $\sigma^A$, the first series of indexes defining a first reordered subsequence $m_{\sigma^A(j)}^A$ of the first sequence and a second reordered subsequence $b_{\sigma^A(j)}^A$ of the second sequence. Then the entity A sends to the entity B, via a non-quantum channel, the first series of indexes.

The first series of indexes may be encrypted before transmission via the non-quantum channel using a second cryptographic key $k^{\sigma^A}$ shared between the first and second entities. The first series of indexes may be encrypted using one-time pad (e.g. using bitwise XOR function).

In step 43A, the entity A receives, from the entity B, via the non-quantum channel, a second series (defined by the index selection function $\sigma^B$) of indexes $\sigma^B(j)$ randomly selected by the entity B.

The second series of indexes (defined by the index selection function $\sigma^B$) may be received in encrypted form: in which case the entity A decrypts the second series of indexes using a fourth cryptographic key $k^{\sigma^B}$ shared between the first and second entities A and B. The second series of indexes may be decrypted using one-time pad (e.g. using bitwise XOR function).

In step 44A, the entity A sends to the entity B, via the non-quantum channel, a fifth reordered subsequence $m_{\sigma^B(j)}^A$ of the first sequence and a sixth reordered subsequence $b_{\sigma^B(j)}^A$ of the second sequence. The fifth respectively sixth reordered subsequence is identified in the first respectively second sequence by the second series of indexes. At least one of the fifth and sixth reordered subsequences is sent in encrypted form.

At least one of the fifth and sixth reordered subsequences may be encrypted before transmission using at least one third cryptographic key $k^{A \to B}$ and/or $l^{A \to B}$ between the first and second entities. At least one of the fifth and sixth reordered subsequences may be encrypted using a one-time pad (e.g. using bitwise XOR function).

In step 46A, the entity A receives from the entity B, via the non-quantum channel, a third reordered subsequence $m_{\sigma^A(j)}^B$ of a third sequence of second binary axis identifiers ($m_i^B$) and a fourth reordered subsequence $b_{\sigma^A(j)}^B$ of a fourth sequence of second bit values ($b_i^B$). The second binary axis identifiers ($m_i^B$) are randomly selected by the entity B. The second bit values ($b_i^B$) are randomly generated by the entity B for the respective second binary axis identifiers ($m_i^B$) in the third sequence. The third respectively fourth reordered subsequence is defined in the third respectively fourth sequence by the first series of indexes $\sigma^A(j)$.

At least one of the third and fourth reordered subsequences is received in encrypted form and in step 46A, the entity A also decrypts the at least one of the third and fourth reordered subsequences that is encrypted. In an embodiment, each of the third and fourth reordered subsequences may be received in encrypted form.

Each of the third and fourth reordered subsequences that is encrypted may be decrypted using one of the at least one first cryptographic key $k^{B \to A}$ and/or $l^{B \to A}$ shared between the first and second entities. Each of the third and fourth reordered subsequences that is encrypted may be decrypted using one-time pad (e.g. using bitwise XOR function).

In step 48A, entity B is authenticated by the entity A on the basis of a number of errors. The number of errors is computed based on a number of pairs of first and second bit values of same index in the second and fourth reordered subsequences that are not equal among the pairs of first and second bit values of same index for which the corresponding axes in the first and third reordered subsequences are the same.

Authenticating the entity B by the entity A may be performed on the basis of a ratio of the number of errors over the number of indexes in the first series of indexes.

The entity B may be authenticated by the entity A if the ratio is below an authentication threshold beyond which an eavesdropper is deemed present with a given probability.

Steps 41B to 48B are performed by entity B and correspond to steps 41A to 48B performed by entity A. For the sake of brevity, they are not described in details here.

The proposed QIA protocol allows to build a longer shared secret key from the source shorter shared secret cryptographic key if Alice and Bob can identify the usable shared bits coming from the remaining pairs of qubits not used by the QIA protocol. For example, once authentication is complete, Alice and Bob may share their remaining measurement axes (they may be shared in unencrypted form) ("sifting" on the remaining qubits). Bit values for which the shared measurement axes coincide are guaranteed to be equal with a probability equal to the estimated ratio of errors $$\overline{QER} = \frac{n_{errors}}{n_A}$$

(because of noise and/or Eve intervention, there may be also errors in the remaining qubits, with the same ratio as in the qubits used for QIA), and can be used to generate a shared cryptographic secret key to be used, part of it may be used as the new source shared cryptographic secret key $k^{init}$ for a next execution of the QIA protocol, the other part may be used to encrypt communications between Alice and Bob using any QKD protocol.

We assume that two shared secret cryptographic keys are used by Alice and Bob for encrypting the two subsequences of qubit-related data sequence and that the randomly selected indexes are also encrypted by Alice and Bob, such that:

2×⌈$\log_2(M)$⌉×|K| bits are used to encrypt the randomly selected indexes obtained by the index selection functions $\sigma^A$ and $\sigma^B$ of qubits used for QIA protocol;

4×|K| bits are used for the shared secret cryptographic keys $(k_j^{B \to A})_{j \in K}$, $(l_j^{B \to A})_{j \in K}$, $(k_j^{B \to A})_{j \in K}$ and $(l_j^{B \to A})_{j \in K}$, where |K| is the number of elements of the set K (by assuming that all these keys are used for encrypting the subsequences).

Up to $C_1 + C_2 \times \lceil \log_2(M) \rceil$ bits are used to encrypt any other required information, with $C_1$ and $C_2$ being two constants independent of M and |K| (M and |K| may be chosen before starting the QKD protocol), for example for the encryption of $n_{errors}^{B \to A}$ and $n_{errors}^{A \to B}$, that may be transmitted at the end of the QIA protocol because the error correction and privacy amplification phases may be a function of $\max\{n_{errors}^{B \to A}, n_{errors}^{A \to B}\}$.

If the initial source shared cryptographic secret key $k^{init}$ is of length $|k^{init}|$, it comes $|k^{init}| = (2 \times \lceil \log_2(M) \rceil + 4) \times |K| + C_1 + C_2 \times \lceil \log_2(M) \rceil$ The new long shared secret key $k^{new}$ of length $|k^{new}|$ is created at the end of QKD protocol if the QIA protocol is successful, i.e., if $\max\{n_{errors}^{B \to A}, n_{errors}^{A \to B}\} \leq n_{errors}^{threshold}$ where $n_{errors}^{threshold}$ is the authentication threshold.

We have, on average, $|k^{new}| \geq \rho \times (M - 2 \times |K|)/2$, where $\rho$ is the reduction factor due to error correction and privacy amplification phases after threshold QIA protocol for the worst case, i.e., when $\max\{n_{errors}^{B \to A}, n_{errors}^{A \to B}\} = n_{errors}^{threshold}$ $$\frac{(M - 2 \times |K|)}{2}$$

is the average number of remaining qubits for key building in the worst case when by chance the random choices $\sigma^A$ and $\sigma^B$ do not include any common index.

The target is to have $|k^{new}| \geq \gamma \times |k^{init}|$ with, for example, $\gamma = 10$ for a new key at least 10 times longer than the initial one that is consumed for QIA protocol We thus must have:

$$\rho \times (M - 2 \times |K|)/2 \geq \gamma \times |k^{init}| =$$

$$\gamma \times (2 \times \lceil \log_2(M) \rceil + 4) \times |K| + C_1 + C_2 \times \lceil \log_2(M) \rceil,$$

i.e., after rewriting the formula:

$$M \geq 2 \times |K| + \frac{2\gamma}{\rho} \times (2 \times \lceil \log_2(M) \rceil + 4) \times |K| + C_1 + C_2 \times \lceil \log_2(M) \rceil,$$

which is always true for M large enough because $$\lim_{M \to \infty} \frac{\log_2(M)}{M} = 0$$

The proposed QIA protocol authenticates qubits shared through the quantum channel, which are the key resources for QKD and the classical channel, instead of only authenticating the classical channel (the authentication through the classical channel with classical methods relies on the security of the classical authentication system, which may be compromised).

The security of the QIA protocol is ensured by the fundamental laws of physics: The QIA protocol relies on quantum mechanics, which has never been contradicted by any experience since its creation one century ago. The proposed QIA protocol ensures the detection of any attack with a level of probability as low as one wants.

Moreover, the QIA protocol evaluates the impact of the attack, by calculating an upper bound on the number of compromised qubits. This allows us to create new shared keys even if there is an attack if its impact is low enough (i.e., when the number of compromised qubits is below a given threshold).

The QIA protocol does not require a third party.

The QIA protocol does not require any authentication of the classical channel. The QKD process will perfectly work even if the classical channel is compromised: The eavesdroppers' modifications of the messages transmitted in the classical channel will be detected but sniffing the classical channel does not bring any useful information to the eavesdroppers about the random key shared by Alice and Bob. Thus, this QIA protocol protects from any attack of eavesdroppers: passive (sniffing) or active (modification) attacks, on one or both of the classical or quantum channels.

In addition, one output of this QIA protocol is the evaluation of the quantum error rate, which is also useful in QKD for error correction. The output of the QIA protocol is of course also useful for the privacy amplification step in QKD.

As a consequence, the QIA protocol is a "3-in-1" solution: authentication+quantum error evaluation (to tune error correction)+privacy level evaluation (to tune privacy amplification).

The proposed QIA protocol may be used to generate a new shared random secret key that is (much) longer than the initial source shared random secret key. Parts of this new key may be used for future generation of new shared random secret keys using the same proposed scheme: Alice and Bob can thus self-authenticate each other without requiring a third party, by using continuously the QIA protocol-based QKD scheme. This continuous self-authentication just needs to be initiated with a single initial source shared cryptographic key for the first use of our proposed QIA protocol-based QKD scheme (and this is required for the first use only). This initial source shared cryptographic key may be physically shared between Alice and Bob, for example when Alice and Bob meet in a same location.

It should be appreciated by those skilled in the art that any functions, engines, block diagrams, flow diagrams, state transition diagrams, flowchart and/or data structures described herein represent conceptual views of illustrative circuitry embodying the principles of the invention. Similarly, it will be appreciated that any flow charts, flow diagrams, state transition diagrams, pseudo code, and the like represent various processes.

Although a flow chart may describe operations as a sequential process, many of the operations may be performed in parallel, concurrently or simultaneously. Also some operations may be omitted, combined or performed in different order. A process may be terminated when its operations are completed but may also have additional steps not disclosed in the figure or description. A process may correspond to a method, function, procedure, subroutine, subprogram, etc. When a process corresponds to a function, its termination may correspond to a return of the function to the calling function or the main function.

Each described function, engine, block, step described herein can be implemented in hardware, software, firmware, middleware, microcode, or any suitable combination thereof.

When implemented in software, firmware, middleware or microcode, instructions to perform the necessary tasks may be stored in a computer readable medium that may be or not included in a host device or host system. The instructions may be transmitted over the computer-readable medium and be loaded onto the host device or host system. The instructions are configured to cause the host device or host system to perform one or more functions disclosed herein. For example, as mentioned above, according to one or more examples, at least one memory may include or store instructions, the at least one memory and the instructions may be configured to, with at least one processor, cause the host device or host system to perform the one or more functions. Additionally, the processor, memory and instructions, serve as means for providing or causing performance by the host device or host system of one or more functions disclosed herein.

The host device or host system may be a general-purpose computer and/or computing system, a special purpose computer and/or computing system, a programmable processing apparatus and/or system, a machine, etc. The host device or host system may be or include or be part of: a user equipment, client device, mobile phone, laptop, computer, network element, data server, network resource controller, network apparatus, router, gateway, network node, computer, cloud-based server, web server, application server, proxy server, etc.

Figure 5:
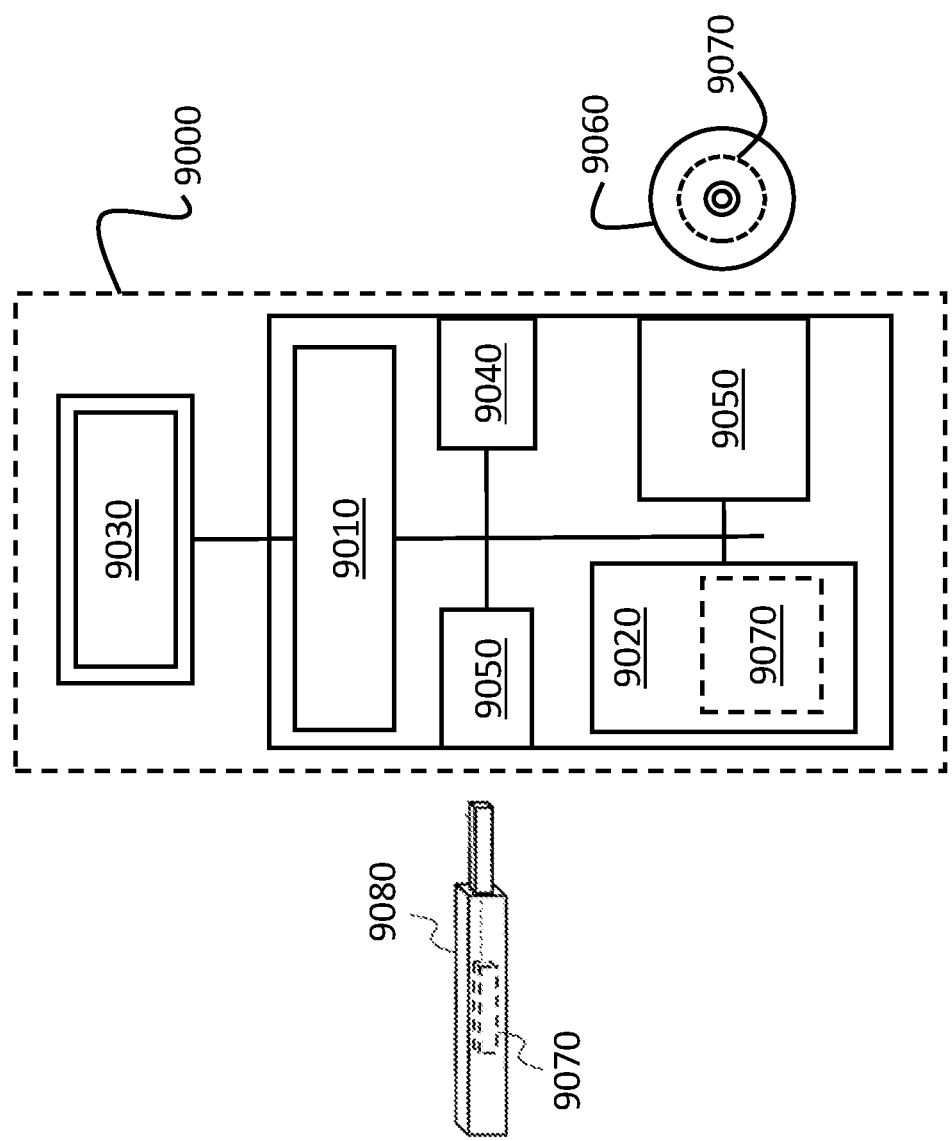
FIG. 5 is a block diagram illustrating an exemplary hardware structure of an apparatus according to an example.

FIG. 5 illustrates an example embodiment of an apparatus 9000. The apparatus 9000 may be a host device or be part of a host device or host system as disclosed herein. The apparatus 9000 may be used for performing one or more or all steps of any method disclosed herein or one or more functions of the entity A or B disclosed herein.

As represented schematically by FIG. 5, the apparatus 9000 may include at least one processor 9010 and at least one memory 9020. The apparatus 9000 may include one or more communication interfaces 9040 (e.g. network interfaces for access to a wired/wireless network, including Ethernet interface, WIFI interface, etc) connected to the processor and configured to communicate via wired/non wired communication link(s). The apparatus 9000 may include user interfaces 9030 (e.g. keyboard, mouse, display screen, etc) connected with the processor. The apparatus 9000 may further include one or more media drives 9050 for reading a computer-readable storage medium (e.g. digital storage disc 9060 (CD-ROM, DVD, Blue Ray, etc), USB key 9080, etc). The processor 9010 is connected to each of the other components 9020, 9030, 9040, 9050 in order to control operation thereof.

The memory 9020 may include a random access memory (RAM), cache memory, non-volatile memory, backup memory (e.g., programmable or flash memories), read-only memory (ROM), a hard disk drive (HDD), a solid state drive (SSD) or any combination thereof. The ROM of the memory 9020 may be configured to store, amongst other things, an operating system of the apparatus 9000 and/or one or more computer program code of one or more software applications. The RAM of the memory 9020 may be used by the processor 9010 for the temporary storage of data.

The processor 9010 may be configured to store, read, load, execute and/or otherwise process instructions 9070 stored in a computer-readable storage medium 9060, 9080 and/or in the memory 9020 such that, when the instructions are executed by the processor, causes the apparatus 9000 to perform one or more or all steps of a method described herein for the concerned apparatus 9000.

The instructions may correspond to program instructions or computer program code. The instructions may include one or more code segments. A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

When provided by a processor, the functions may be provided by a single dedicated processor, by a single shared processor, or by a plurality of individual processors, some of which may be shared. The term "processor" should not be construed to refer exclusively to hardware capable of executing software and may implicitly include one or more processing circuits, whether programmable or not. A processor or likewise a processing circuit may correspond to a digital signal processor (DSP), a network processor, an application specific integrated circuit (ASIC), a field programmable gate array (FPGA), a System-on-Chips (SoC), a Central Processing Unit (CPU), an arithmetic logic unit (ALU), a programmable logic unit (PLU), a processing core, a programmable logic, a microprocessor, a controller, a microcontroller, a microcomputer, a quantum processor, any device capable of responding to and/or executing instructions in a defined manner and/or according to a defined logic. Other hardware, conventional or custom, may also be included. A processor or processing circuit may be configured to execute instructions adapted for causing the host device or host system to perform one or more functions disclosed herein for the host device or host system.

A computer readable medium or computer readable storage medium may be any tangible storage medium suitable for storing instructions readable by a computer or a processor. A computer readable medium may be more generally any storage medium capable of storing and/or containing and/or carrying instructions and/or data. The computer readable medium may be a non-transitory computer readable medium. The term "non-transitory", as used herein, is a limitation of the medium itself (i.e., tangible, not a signal) as opposed to a limitation on data storage persistency (e.g., RAM vs. ROM).

A computer-readable medium may be a portable or fixed storage medium. A computer readable medium may include one or more storage device like a permanent mass storage device, magnetic storage medium, optical storage medium, digital storage disc (CD-ROM, DVD, Blue Ray, etc), USB key or dongle or peripheral, a memory suitable for storing instructions readable by a computer or a processor.

A memory suitable for storing instructions readable by a computer or a processor may be for example: read only memory (ROM), a permanent mass storage device such as a disk drive, a hard disk drive (HDD), a solid state drive (SSD), a memory card, a core memory, a flash memory, or any combination thereof.

In the present description, the wording "means configured to perform one or more functions" or "means for performing one or more functions" may correspond to one or more functional blocks comprising circuitry that is adapted for performing or configured to perform the concerned function(s). The block may perform itself this function or may cooperate and/or communicate with other one or more blocks to perform this function. The "means" may correspond to or be implemented as "one or more modules", "one or more devices", "one or more units", etc. The means may include at least one processor and at least one memory including computer program code, wherein the at least one memory and the computer program code are configured to, with the at least one processor, cause an apparatus or system to perform the concerned function(s).

As used in this application, the term "circuitry" may refer to one or more or all of the following:
   (a) hardware-only circuit implementations (such as implementations in only analog and/or digital circuitry) and
   (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and
   (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, an integrated circuit for a network element or network node or any other computing device or network device.

The term circuitry may cover digital signal processor (DSP) hardware, network processor, application specific integrated circuit (ASIC), field programmable gate array (FPGA), etc. The circuitry may be or include, for example, hardware, programmable logic, a programmable processor that executes software or firmware, and/or any combination thereof (e.g. a processor, control unit/entity, controller) to execute instructions or software and control transmission and receptions of signals, and a memory to store data and/or instructions.

The circuitry may also make decisions or determinations, generate frames, packets or messages for transmission, decode received frames or messages for further processing, and other tasks or functions described herein. The circuitry may control transmission of signals or messages over a radio network, and may control the reception of signals or messages, etc., via one or more communication networks.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

LIST OF MAIN ABBREVIATIONS

QER Quantum Error Rate
QIA protocol Quantum Identity Authentication
QKD Quantum Key Distribution

LIST OF CITED REFERENCES

[ref.CV-QKD] Fabian Laudenbach et al., Continuous-Variable Quantum Key Distribution with Gaussian Modulation—The Theory of Practical Implementations, Adv. Quantum Technol. 1800011 (2018), https://arxiv.org/abs/1703.09278v3

[BB84] C. H. Bennett and G. Brassard, "Quantum cryptography: Public-key distribution and coin tossing," in Proceeding of the IEEE International Conference on Systems and Signal Processing, Washington, IEEE, pp. 175-179 (1984), https://arxiv.org/ftp/arxiv/papers/2003/2003.06557.pdf

The invention claimed is:

1. A method comprising:
   obtaining, by a first entity, a first sequence of first binary axis identifiers randomly selected by the first entity and a second sequence of first bit values randomly generated by the first entity for the respective first binary axis identifiers;
   randomly selecting, by the first entity, a first series of indexes defining a first subsequence of the first sequence and a second subsequence of the second sequence;
   sending, by the first entity to a second entity, via a non-quantum channel, the first series of indexes;
   receiving, by the first entity from the second entity, via the non-quantum channel, a third subsequence of a third sequence of second binary axis identifiers randomly selected by the second entity and a fourth subsequence of a fourth sequence of second bit values randomly generated by the second entity for the respective second binary axis identifiers in the third sequence, wherein the third respectively fourth subsequence is defined in the third respectively fourth sequence by the first series of indexes; wherein the second and fourth sequences have been generated using a quantum channel between the first entity and the second entity such that pairs of first and second bit values of same index generated for the same corresponding axis are equal, wherein at least one of the third and fourth subsequences is encrypted;

decrypting the at least one of the third and fourth subsequences that is encrypted;

authenticating the second entity by the first entity on the basis of a number of errors, wherein the number of errors is computed based on a number of pairs of the first and the second bit values of same index in the second and fourth subsequences that are not equal among the pairs of the first and the second bit values of same index for which the corresponding axes in the first and third subsequences are the same.

2. The method of claim 1, wherein at least one of the third and fourth subsequences is received in encrypted form, wherein the at least one of the third and fourth subsequences that is encrypted is decrypted using at least one first cryptographic key shared between the first and second entities.

3. The method of claim 2, wherein each of the third and fourth subsequences is received in encrypted form and is decrypted using one of the at least one first cryptographic key using one-time pad.

4. The method of claim 2, wherein the at least one of the third and fourth subsequences that is encrypted is decrypted using one-time pad.

5. The method according to claim 1, wherein the first series of indexes is encrypted, before transmission via the non-quantum channel, using a second cryptographic key shared between the first and second entities.

6. The method of claim 5, wherein the first series of indexes is encrypted using the second cryptographic key using one-time pad.

7. The method according to claim 1, wherein authenticating the second entity by the first entity is performed on the basis of a ratio of the number of errors over the number of indexes in the first series of indexes.

8. The method of claim 7, wherein the second entity is authenticated by the first entity if the ratio is below an authentication threshold beyond which an eavesdropper is deemed present with a given probability.

9. The method according to claim 1, comprising receiving, by the first entity from the second entity, via the non-quantum channel, a second series of indexes randomly selected by the second entity;

sending, by the first entity to the second entity, via the non-quantum channel, a fifth subsequence of the first sequence and a sixth subsequence of the second sequence, wherein the fifth respectively sixth subsequence is identified in the first respectively second sequence by the second series of indexes, wherein at least one of the fifth and sixth subsequences is sent in encrypted form.

10. The method according to claim 9, wherein at least one of the fifth and sixth subsequences is encrypted before transmission using at least one third cryptographic key shared between the first and second entities.

11. An apparatus comprising: at least one processor; and at least one memory storing instructions that, when executed by the at least one processor, cause the apparatus at least to: obtain, by a first entity, a first sequence of first binary axis identifiers randomly selected by the first entity and a second sequence of first bit values randomly generated by the first entity for the respective first binary axis identifiers;

randomly select, by the first entity, a first series of indexes defining a first subsequence of the first sequence and a second subsequence of the second sequence;

send, by the first entity to a second entity, via a non-quantum channel, the first series of indexes;

receive, by the first entity from the second entity, via the non-quantum channel, a third subsequence of a third sequence of second binary axis identifiers randomly selected by the second entity and a fourth subsequence of a fourth sequence of second bit values randomly generated by the second entity for the respective second binary axis identifiers in the third sequence, wherein the third respectively fourth subsequence is defined in the third respectively fourth sequence by the first series of indexes; wherein the second and fourth sequences have been generated using a quantum channel between the first entity and the second entity such that pairs of first and second bit values of same index generated for the same corresponding axis are equal, wherein at least one of the third and fourth subsequences is encrypted;

decrypt the at least one of the third and fourth subsequences that is encrypted;

authenticate the second entity by the first entity on the basis of a number of errors, wherein the number of errors is computed based on a number of pairs of first and second bit values of same index in the second and fourth subsequences that are not equal among the pairs of first and second bit values of same index for which the corresponding axes in the first and third subsequences are the same.

12. The apparatus of claim 11, wherein at least one of the third and fourth subsequences is received in encrypted form, wherein the at least one of the third and fourth subsequences that is encrypted is decrypted using at least one first cryptographic key shared between the first and second entities.

13. The apparatus of claim 12, wherein each of the third and fourth subsequences is received in encrypted form and is decrypted using one of the at least one first cryptographic key using one-time pad.

14. The apparatus of claim 12, wherein the at least one of the third and fourth subsequences that is encrypted is decrypted using one-time pad.

15. The apparatus according to claim 11, wherein the first series of indexes is encrypted, before transmission via the non-quantum channel, using a second cryptographic key shared between the first and second entities.

16. The apparatus of claim 15, wherein the first series of indexes is encrypted using the second cryptographic key using one-time pad.

17. The apparatus according to claim 11, wherein the authenticating of the second entity by the first entity is performed on the basis of a ratio of the number of errors over the number of indexes in the first series of indexes.

18. The apparatus of claim 17, wherein the second entity is authenticated by the first entity if the ratio is below an authentication threshold beyond which an eavesdropper is deemed present with a given probability.

19. The apparatus according to claim 11, wherein the at least one processor; and the at least one memory storing instructions that, when executed by the at least one processor, further cause the apparatus at least to:

receive, by the first entity from the second entity, via the non-quantum channel, a second series of indexes randomly selected by the second entity;

send, by the first entity to the second entity, via the non-quantum channel, a fifth subsequence of the first sequence and a sixth subsequence of the second sequence, wherein the fifth respectively sixth subsequence is identified in the first respectively second sequence by the second series of indexes, wherein at least one of the fifth and sixth subsequences is sent in encrypted form.

20. The apparatus according to claim 19, wherein at least one of the fifth and sixth subsequences is encrypted before transmission using at least one third cryptographic key shared between the first and second entities.

\* \* \* \* \*